US011714598B2

(12) United States Patent
Jung et al.

(10) Patent No.: US 11,714,598 B2
(45) Date of Patent: Aug. 1, 2023

(54) FEEDBACK METHOD AND APPARATUS OF ELECTRONIC DEVICE FOR CONFIRMING USER'S INTENTION

(71) Applicant: Samsung Electronics Co., Ltd., Suwon-si (KR)

(72) Inventors: Wonheui Jung, Suwon-si (KR); Youngmin Yoon, Suwon-si (KR); Edward Arthur Schweizer, San Jose, CA (US); Jared Michael Lodwick, San Jose, CA (US); Mieko Haire, San Jose, CA (US); Richard James Schatzberger, Los Angeles, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 16/535,926

(22) Filed: Aug. 8, 2019

(65) Prior Publication Data
US 2020/0050426 A1 Feb. 13, 2020

(30) Foreign Application Priority Data
Aug. 8, 2018 (KR) .................. 10-2018-0092613

(51) Int. Cl.
*G06F 3/16* (2006.01)
*G06N 5/02* (2023.01)
*G06F 3/01* (2006.01)

(52) U.S. Cl.
CPC .............. *G06F 3/167* (2013.01); *G06F 3/016* (2013.01); *G06N 5/02* (2013.01)

(58) Field of Classification Search
CPC ............ G06F 3/167; G06F 3/016; G06N 5/02
(Continued)

(56) References Cited

U.S. PATENT DOCUMENTS 8,369,887 B2    2/2013  Choe et al.
10,170,116 B1 * 1/2019  Kelly ..................... G06F 3/167
(Continued)

FOREIGN PATENT DOCUMENTS

EP          3 243 199 A1    11/2017
KR    10-2013-0016024 A     2/2013
(Continued)

OTHER PUBLICATIONS

International Search Report dated Nov. 21, 2019, issued in International Application No. PCT/KR2019/009947.
(Continued)

*Primary Examiner* — Tuan S Nguyen
(74) *Attorney, Agent, or Firm* — Jefferson IP Law, LLP

(57) ABSTRACT

A method and an apparatus for providing feedback for confirming a user's intention during an interactive artificial intelligence (AI) service (e.g., a virtual secretary service and a virtual friend service) is provided by an electronic device. The electronic device includes an input/output interface for a dialogic interaction with a user and at least one processor configured to control to execute a service based on the dialogic interaction with the user, monitor a process during the service, detect entry to a predetermined phase based on a result of the monitoring, and output at least one feedback alerting the user to the predetermined phase. Other embodiments are possible.

17 Claims, 20 Drawing Sheets

(58) Field of Classification Search
USPC .......................................................... 715/702
See application file for complete search history.

(56) References Cited

U.S. PATENT DOCUMENTS

| | | | |
|---|---|---|---|
| 10,452,349 B2 | 10/2019 | Kim et al. | |
| 10,467,615 B1* | 11/2019 | Omojola | G06Q 30/0637 |
| 10,643,618 B1* | 5/2020 | Dremonas | A47F 9/046 |
| 2002/0082989 A1* | 6/2002 | Fife | G06Q 20/04 |
| | | | 705/39 |
| 2003/0018531 A1* | 1/2003 | Mahaffy | G06Q 20/20 |
| | | | 705/16 |
| 2004/0098316 A1* | 5/2004 | Philippe | G06F 40/123 |
| | | | 705/26.62 |
| 2007/0061497 A1* | 3/2007 | Takatsuka | G05B 15/02 |
| | | | 711/100 |
| 2009/0167508 A1* | 7/2009 | Fadell | G08B 6/00 |
| | | | 340/407.2 |
| 2011/0282669 A1* | 11/2011 | Michaelis | G10L 25/90 |
| | | | 704/270 |
| 2012/0016678 A1* | 1/2012 | Gruber | G06F 40/279 |
| | | | 704/E21.001 |
| 2013/0033422 A1 | 2/2013 | Choi et al. | |
| 2013/0154826 A1* | 6/2013 | Ratajczyk | H04M 19/047 |
| | | | 340/539.11 |
| 2014/0156796 A1 | 6/2014 | Hong et al. | |
| 2015/0169336 A1* | 6/2015 | Harper | G10L 15/22 |
| | | | 715/706 |
| 2016/0203002 A1 | 7/2016 | Kannan et al. | |
| 2017/0048585 A1 | 2/2017 | Dong et al. | |
| 2017/0076212 A1* | 3/2017 | Shams | G06F 3/167 |
| 2018/0144743 A1 | 5/2018 | Aggarwal et al. | |
| 2018/0314532 A1* | 11/2018 | Badr | G06F 40/279 |

FOREIGN PATENT DOCUMENTS

| | | |
|---|---|---|
| KR | 10-2014-0115862 A | 10/2014 |
| KR | 10-2017-0033641 A | 3/2017 |
| KR | 10-2017-0090472 A | 8/2017 |
| KR | 10-2018-0054362 A | 5/2018 |
| KR | 10-1854357 B1 | 6/2018 |
| WO | 2016/111881 A1 | 7/2016 |
| WO | 2018/093468 A1 | 5/2018 |

OTHER PUBLICATIONS

Extended European Search Report dated Jul. 14, 2021, issued in European Patent Application No. 19846116.2-1203.
European Office Action dated Apr. 17, 2023, issued in a counterpart European Application No. 19 846 116.2-1224.
Korean Office Action dated Apr. 20, 2023, issued in a counterpart Korean Application No. 10-2018-0092613.

* cited by examiner

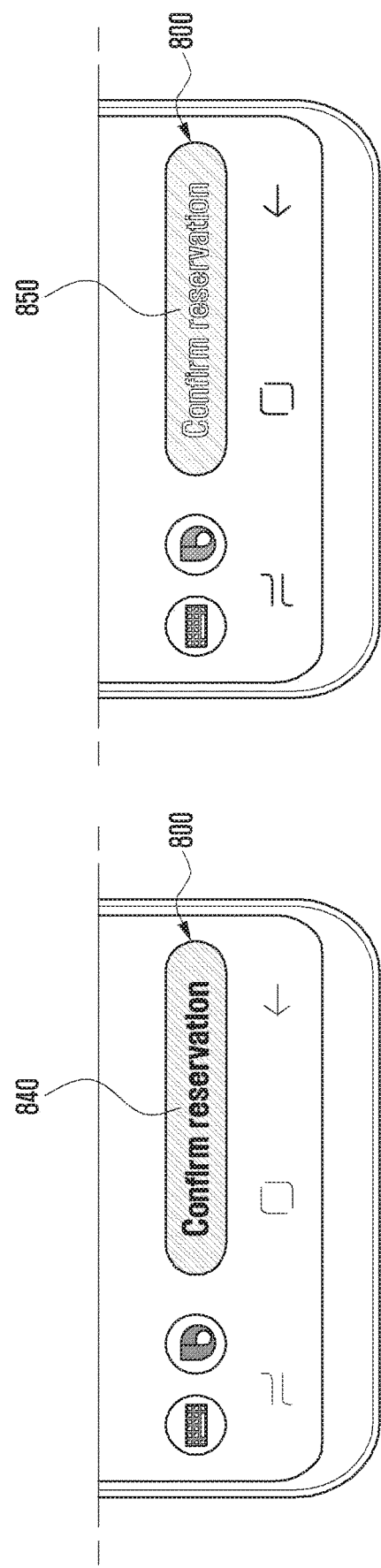

FEEDBACK METHOD AND APPARATUS OF ELECTRONIC DEVICE FOR CONFIRMING USER'S INTENTION

CROSS-REFERENCE TO RELATED APPLICATION(S)

This application is based on and claims priority under 35 U.S.C. § 119(a) of a Korean patent application number 10-2018-0092613, filed on Aug. 8, 2018, in the Korean Intellectual Property Office, the disclosure of which is incorporated by reference herein in its entirety.

BACKGROUND

1. Field

The disclosure relates to a method and an apparatus for providing feedback for confirming a user's intention during an interactive artificial intelligence (AI) service (e.g., a virtual secretary service and a virtual friend service) provided by an electronic device.

2. Description of the Related Art

With the advance of digital technologies, various types of electronic devices are widely used these days. Examples of the electronic devices include a mobile communication terminal, a smartphone, a tablet personal computer (PC), a laptop PC, a personal digital assistant (PDA), a wearable device, and a digital camera.

Recently, the electronic device provides various speech recognition technology-based services (functions). The speech recognition technology may include a technique for converting an acoustic speech signal captured by a sound sensor, such as a microphone to a word or a sentence. Typically, the speech recognition technology is performed in such a way of extracting a sound signal, canceling a noise from the sound signal, extracting features of a noise-cancelled speech signal, and comparing the extracted features with a speech model database (DB).

Recently, various speech recognition technology-based services (e.g., a virtual secretary service) have been developed and provided. For example, the electronic device may be designed to allow for a user to control various life convenience services (such as mobile search, schedule management, placing a call, memo, and music playback) using voice commands. More recently, the speech recognition technology is grafted with AI services to implement speech interactive services. For example, a speech interactive service may be provided in such a way that a speech recognition-enable electronic device collects speech uttered by a user, analyzes the collected speech to interpret a user's intention, generates correspondent response information, and executes a pertinent function or provides the user with pertinent information.

However, electronic devices lack the capability to provide feedback for confirming the exact intention of the user during a user-interactive service. For example, during a transaction operation that should be carefully handled, an interactive electronic device processes even the last phase of the transaction without confirmation of the accurate intention of the user. For example, the electronic device processes an access attempt to important user information in the form of everyday dialogue without any confirmation from the user. Such a procedure is likely to allow for unintentional access to the important information of the user without awareness of the user who is distracted from the transaction by the speech interaction with the electronic device even at the final phase.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and electronic device that is capable of providing feedback alerting a user to pay attention to the final phase of an interactive service (e.g., a virtual secretary service or virtual friend service) during the interactive service.

Another aspect of the disclosure is to provide a method and electronic device that is capable of monitoring a voice-based virtual secretary service running on the electronic device for a final phase and providing a user with feedback alerting the user to the entry to the final phase.

Another aspect of the disclosure is to provide a method and electronic device that is capable of providing feedback alerting a user to a final phase of a service along with a brand identity (BI).

Additional aspects will be set forth in part in the description which follows and, in part, will be apparent from the description, or may be learned by practice of the presented embodiments.

In accordance with an aspect of the disclosure, an electronic device is provided. The electronic device includes an input/output interface for a dialogic interaction with a user and at least one processor configured to control to execute a service based on the dialogic interaction with the user, monitor a process during the service, detect entry to a predetermined phase based on a result of the monitoring, and output at least one feedback alerting the user to the predetermined phase.

In accordance with another aspect of the disclosure, an operation method of an electronic device is provided. The method includes executing a service based on a dialogic interaction with a user, monitoring a process during the service, detecting entry to a predetermined phase based on a result of the monitoring, and outputting at least one feedback alerting the user to the predetermined phase.

According to various embodiments of the disclosure, a computer readable storage medium stores a program executable by at least one processor to implement the method for addressing the above issues.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8A, 8B, 8C, and 8D are diagrams illustrating a feedback method of an electronic device according to various embodiments of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
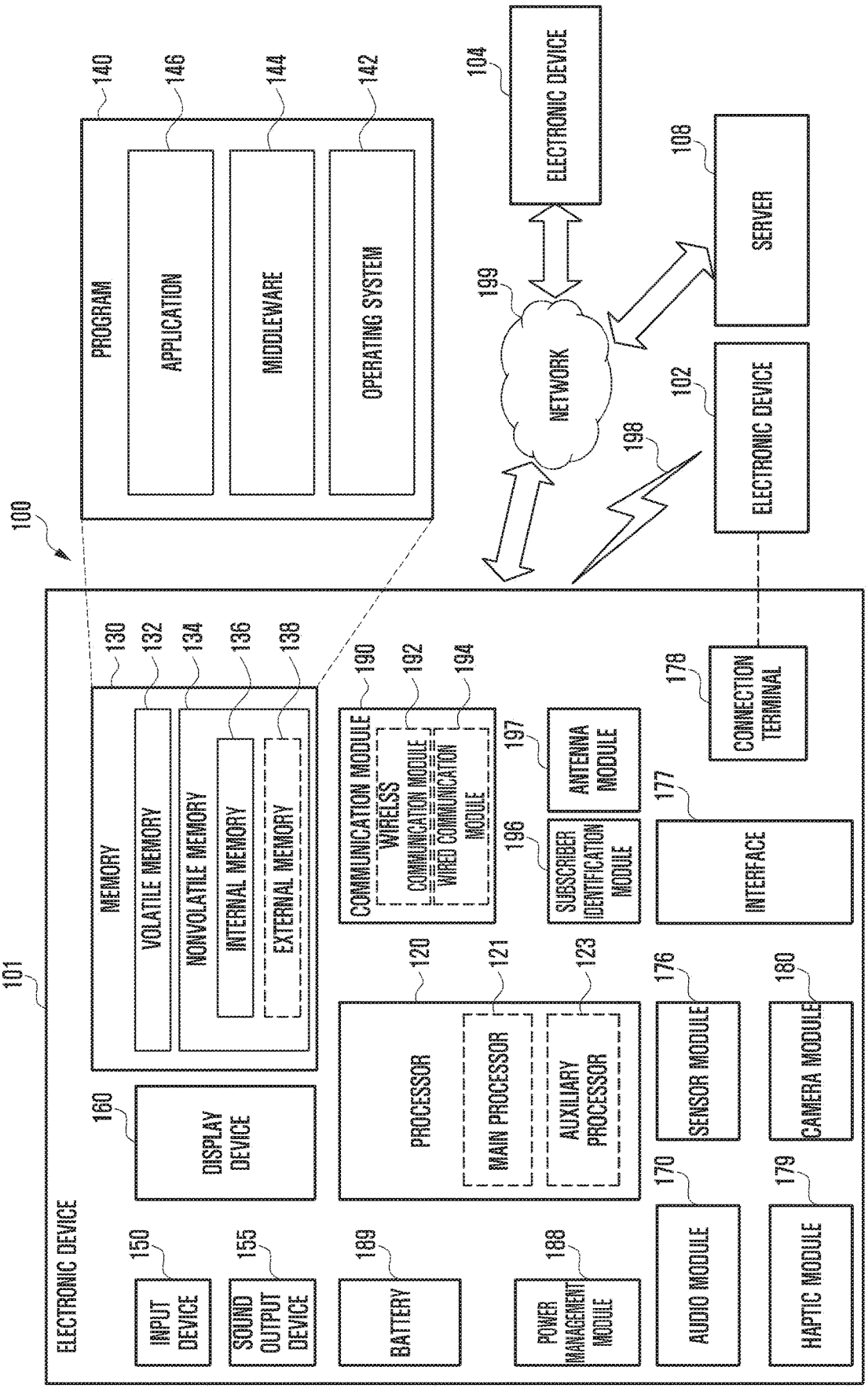
FIG. 1 is a block diagram illustrating a configuration of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
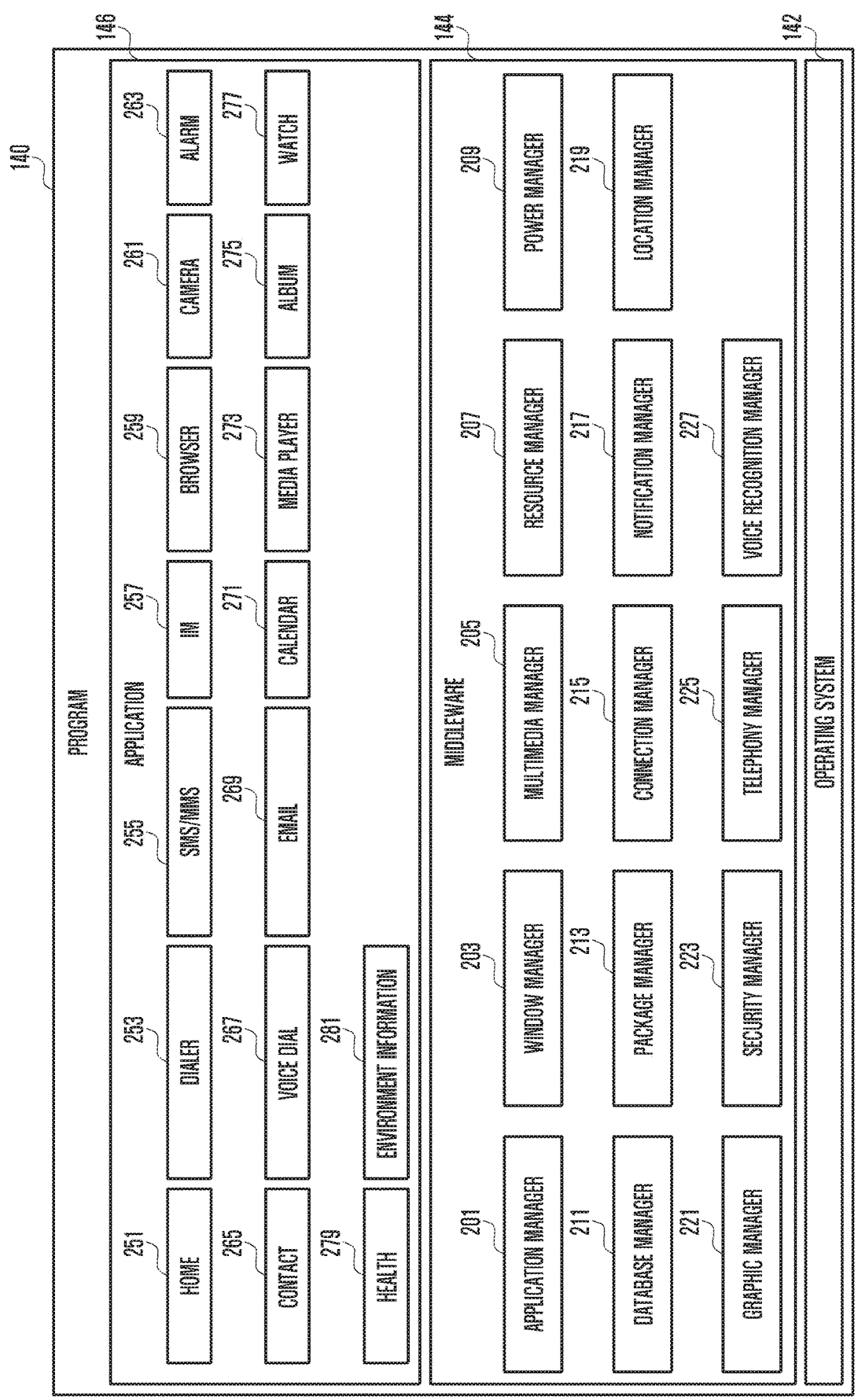
FIG. 2 is a block diagram illustrating a program according to an embodiment of the disclosure.

FIG. 2 is a block diagram illustrating a program according to an embodiment of the disclosure.

Referring to FIG. 2, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., a process, a memory, or a power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, a dialer 253, a short message service (SMS)/multimedia messaging service (MMS) 255, an instant message (IM) 257, a browser 259, a camera 261, an alarm 263, a contact 265, a voice recognition 267, an email 269, a calendar 271, a media player 273, an album 275, a watch 277, health 279

(e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, a message, or an alert) to the external electronic device or a device management application adapted to manage the external electronic device.

The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

The electronic device 101 according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
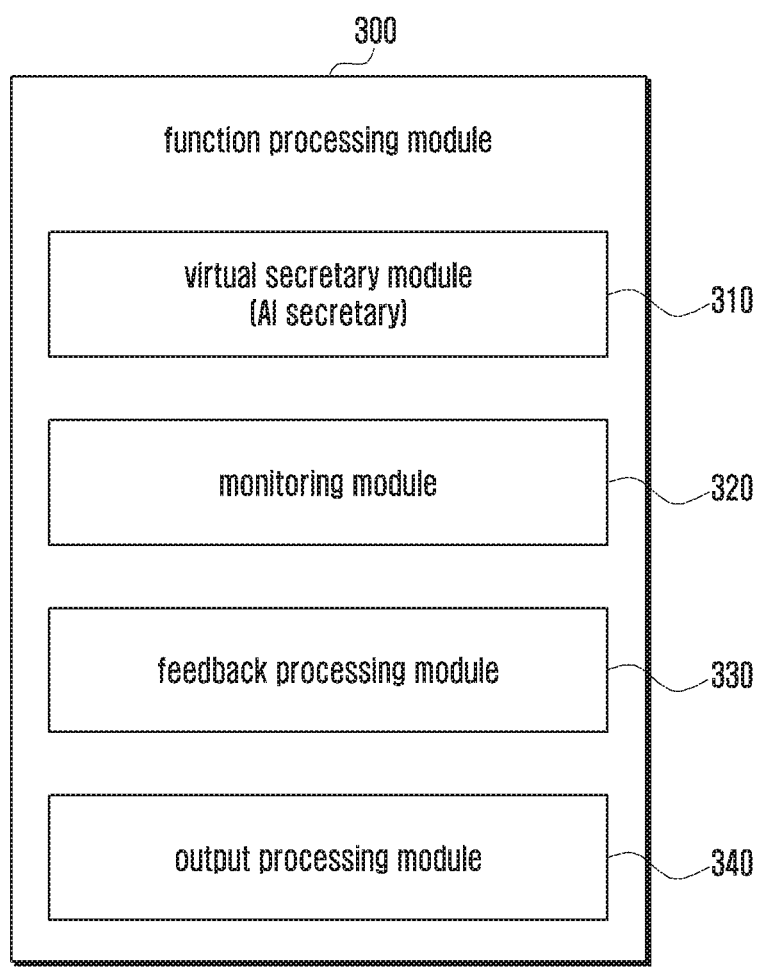
FIG. 3 is a block diagram illustrating a configuration of a function processing module of an electronic device according to an embodiment of the disclosure.

FIG. 3 is a block diagram illustrating a configuration of a function processing module of an electronic device according to an embodiment of the disclosure.

Referring to FIG. 3, a function processing 300 may be a module for executing a function of providing feedback alerting a user to entry of a final phase of voice-based interaction (or interactive mode) between the user and the electronic device 101 so as to improve user convenience. In the embodiment of FIG. 3, the function processing module 300 monitors a voice-based virtual secretary operation for entry to a final phase and provides feedback alerting the user to the entry to the final phase. According to various embodiments, the function processing module 300 may be a processor (e.g., the processor 120 in FIG. 1) including a processing circuitry and implemented in the form of a hardware module or a software module.

Referring to FIG. 3, the function processing module 300 may include a virtual secretary module 310, a monitoring module 320, a feedback processing module 330 and an output processing module 340.

In various embodiments, the virtual secretary module 310 may perform a voice-based virtual secretary (or AI secretary or virtual friend) or voice agent operation. According to an embodiment, the virtual secretary module 310 may identify a user's intention from a user's utterance via a voice agent and output a response corresponding to the user's intention. For example, the virtual secretary module 310 may perform a voice-based dialogic interaction with the user to process an AI dialogue.

In various embodiments, the monitoring module 320 may monitor a process of the virtual secretary operation. According to an embodiment, the monitoring module 320 may monitor the interaction with the user for entry to a final phase (or final confirmation phase) related to an execution result of an AI service. According to various embodiments, the final phase is a phase for confirming a result of processing the interaction with the user, e.g., a phase for confirming whether to execute the processing result. For example, the final phase may include confirming whether to execute a command (e.g., settlement, reservation, ticket booking, information deletion, and placing a call or transmitting a message) right before executing the command as a result of processing the interaction. According to an embodiment, the monitoring module 320 may determine entry to the final phase if all parameters (or interactive parameters) are filled in accordance with a virtual secretary operation scenario based on an interaction with a user.

In various embodiments, the monitoring module 320 may detect entry to a predetermined phase (e.g., final phase) based on the process monitoring result. According to an embodiment, the monitoring module 320 may monitor the interaction with the user for entry to the final phase of the ongoing AI service and generate a pertinent trigger (e.g., feedback output trigger or interrupt) in response to a determination on the entry to the final phase.

In various embodiments, the feedback processing module 330 may generate pertinent feedback information at least based on a predetermined feedback scheme. According to an embodiment, the feedback processing module 330 may determine entry to a state for providing the user with feedback in response to the trigger generated by the monitoring module 320.

According to an embodiment, the feedback processing module 330 may generate feedback information related to alerting the user of the final phase in order for the user to confirm whether a state (or result) of the final phase matches the user's intention. According to an embodiment, the feedback may include information for use by the user in determining whether a result (or action (information) to be taken as a result) of the final phase matches the user's intention. According to an embodiment, the feedback processing module 330 may generate feedback information according to one of various feedback schemes to alert the user to the final phase before completing the final phase with at least one of a visual element, an auditory element, or a tactile element.

According to various embodiments, the feedback procession module 330 may generate feedback information based on at least one condition (e.g., a device characteristic and a device use state). According to an embodiment, the feedback processing module 330 may generate the feedback information by reflecting a BI.

In various embodiments, the BI may be an object allowing the user to quickly identify (recognize) a target (or brand) (e.g., target function (e.g., information deletion function and message transmission function), target company, and target product) intended by the user in the AI service. For example, the BI may be generated based on at least one of a color, an image (or icon or mark), a text (e.g., a logo), or a sound (e.g., a commercial message (CM) song and a logo song) unique for a brand that is memorized by the user along with a field, an ideology, a goal, an activity, an expression, or an image of the corresponding brand. According to an embodiment, the BI may be predefined in the electronic device or acquired from a brand server by requesting to the server via an AI service.

In various embodiments, the output processing module 340 may process feedback output with at least one of a visual element, an auditory element, or a tactile element based on the feedback information generated by the feedback processing module 330. According to an embodiment, the output processing module 340 may output feedback based on at least one of a voice (or a voice alert), a sound (or a sound effect), a visual (or a visual effect), or a vibration. According to an embodiment, the output processing module 340 may control to output the feedback in cooperation with a component (e.g., a display, a speaker, and a haptic module (or a vibration module) depending on the property of information on the feedback to be output. A description thereof is made later with reference to the accompanying drawings.

As described above, the electronic device 101 according to various embodiments may include an input/output interface (e.g., the input device 150, the sound output device 155, and the display device 160) for dialogic interaction with the user and a processor (e.g., the processor 120) that is configured to execute a service based on voice-based dialogic interaction with the user, monitor a process of the ongoing service, detect entry to a predetermined phase based on a result of the monitoring, and output at least one feedback alerting the user to entry to the predetermined phase.

According to various embodiments, the processor 120 may determine entry to a final phase in an operation scenario of the service during the dialogic interaction with the user.

According to various embodiments, the processor 120 may determine entry to the final phase based on all parameters being filled in according to an operation scenario of the service.

According to various embodiments, the processor 120 may output the at least one feedback alerting the user to entry to the final phase with at least one of a visual element, an auditory element, or a tactical element.

According to various embodiments, the processor 120 may output the at least one feedback based on least one of a voice feedback mode, a sound feedback mode, a visual feedback mode, or a vibration feedback mode.

According to various embodiments, the processor 120 may make a determination on a feedback mode for the at least one feedback based on a device property of the electronic device.

According to various embodiments, the processor 120 may make a determination on a feedback mode for the at least one feedback based on a use state of the electronic device 101.

According to various embodiments, the processor 120 may output the feedback along with a BI.

According to various embodiments, the BI may include an object allowing a user to quickly identify a target intended by the user in the service.

According to various embodiments, the processor 120 may generate the BI as an object with a visual, auditory, or tactile element corresponding to the feedback mode.

Figure 4:
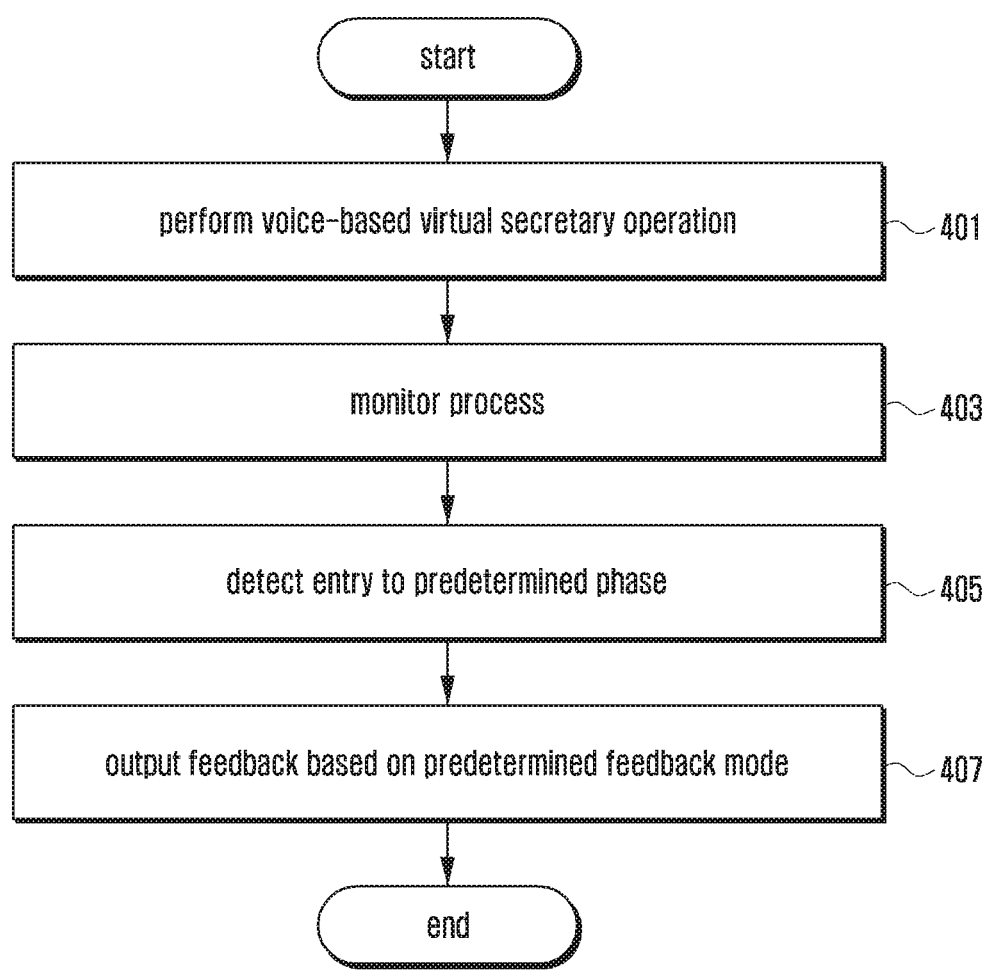
FIG. 4 is a flowchart illustrating an operation method of an electronic device according to an embodiment of the disclosure.

FIG. 4 is a flowchart illustrating an operation method of an electronic device according to an embodiment of the disclosure.

Referring to FIG. 4, a processor 120 (e.g., at least one processor including a processing circuit or a function processing module in FIG. 3) of the electronic device 101 may perform a voice-based virtual secretary (or virtual friend or voice agent) operation at operation 401. According to an embodiment, the processor 120 may identify a user's intention from a user's utterance and outputs a response corresponding to the user's intention. For example, the processor 120 may perform a voice-based dialogic interaction with the user to process an AI dialogue. According to an embodiment, the processor 120 may perform an interaction related to a virtual secretary operation (or service) using components (or input/out interfaces) configured for a dialogic interaction with the user (e.g., the input device 150 in FIG. 1 (e.g., a microphone), the sound output device 155 in FIG. 1 (e.g., a speaker), and the display device 160 in FIG. 1 (e.g., a display)).

According to an embodiment, the user may control the electronic device 101 (e.g., input a voice- or touch-based wakeup command) to execute an AI service (or wake up a voice agent) to make a reservation for a restaurant. Upon execution of the AI service, the user may utter various queries and instructions pertinent to a restaurant reservation process, and the processor 230 may output answers (e.g., voice-based output) corresponding to the user's intentions identified from the user user's utterances and process the reservation-related information collected though the interaction with the user.

According to an embodiment, the processor may fill in reservation-related information fields with the collected reservation-related information internally or openly (e.g., displaying the information on a display). For example, the processor 120 may confirm the restaurant for which a reservation is to be made and configure the reservation information by filling in the reservation-related information fields with detailed reservation information, such as a reservation date, a reservation time, and a number of persons for the reservation. According to an embodiment, the electronic device 101 may be a device equipped with a display, such as a smartphone and openly display the process ongoing based on the interaction with the user in order for the user to advance through the AP service checking the progress on the display.

According to an embodiment, the electronic device is a device equipped with no display, such as a smart speaker, and the ongoing process based on the interaction with the user may be internally processed and managed.

At operation 403, the processor 120 may monitor the process (or ongoing process) of the virtual secretary operation. According to an embodiment, the processor 120 may monitor the interaction with the user for making a determination on entry to the final phase (final confirmation phase) as a result of the execution of the AI service. According to various embodiments, the final phase may be a phase for confirming the result from processing the interaction with the user, e.g., a phase for confirming whether to execute an operation based on the processing result. For example, the final phase may include confirming whether to execute a command (e.g., settlement, reservation, ticket booking, information deletion, and placing a call/transmitting a message) right before executing the command as a result of processing the interaction.

At operation 405, the processor 120 may detect entry to a predetermined phase based on a result of monitoring the process. According to an embodiment, the processor 120 may monitor the ongoing process for making a determination on entry to the final phase of the AI service in progress through the interaction with the user.

At operation 407, the processor may control a feedback output based on a predetermined feedback mode. According to an embodiment, upon detection of the entry to the final phase, the processor 120 may output feedback for confirming whether a state (or result) of the final phase matches the situation intended by the user. According to an embodiment, the feedback may include information for use by the user in determining whether the result (or action (information) to be taken as a result) of the final phase matches the user's intention.

According to an embodiment, the processor 120 may control a feedback output based on at least one of a visual element, an auditory element, or a tactile element. For example, the processor 120 may control to output a feedback alerting the user to the final phase before executing an operation resulting from the final phase in one of various feedback modes. According to various embodiments, the processor 120 may control to determine at least one feedback mode for outputting the feedback in the at least one feedback mode selected based on at least one condition. Descriptions are made of the feedback output methods later with reference to the accompanying drawings.

Figure 5:
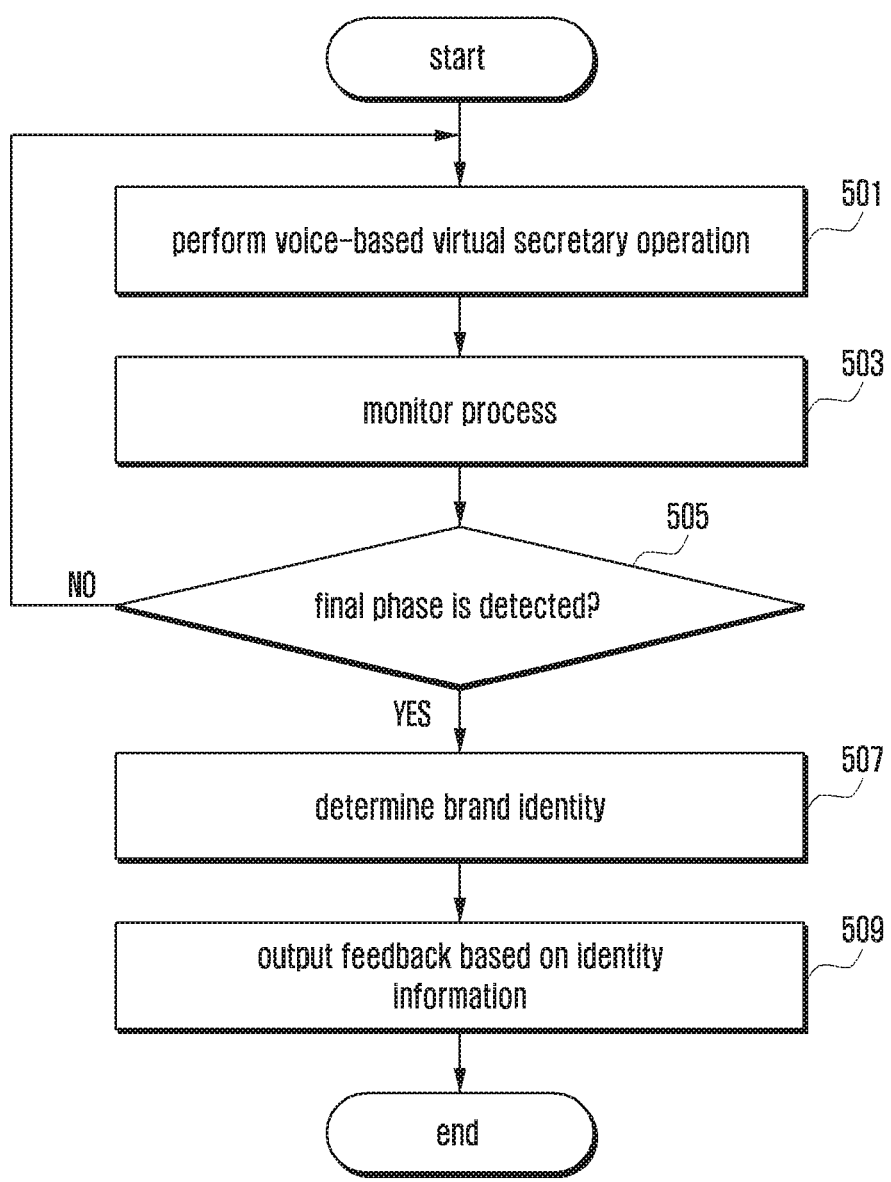
FIG. 5 is a flowchart illustrating an operation method of an electronic device according to an embodiment of the disclosure.

FIG. 5 is a flowchart illustrating an operation method of an electronic device according to an embodiment of the disclosure.

Referring to FIG. 5, a processor 120 (e.g., at least one processor including a processing circuit or a function processing module in FIG. 3) of the electronic device 101 may perform a voice-based virtual secretary (or virtual friend or voice agent) operation at operation 501.

At operation 503, the processor 120 may monitor the process of the virtual secretary operation.

At operation 505, the processor 120 may determine whether a final phase is detected based on a result of monitoring the process.

If it is determined at operation 505 that the final phase is not detected (NO), the processor 120 may perform the operation of operation 501 and subsequent operations.

If it is determined at operation 505 that the final phase is detected (YES), the processor 120 may determine a BI at operation 507. According to various embodiments, the BI may be an object allowing the user to quickly identify (recognize) a target (or brand) (e.g., target function (e.g., information deletion function and message transmission function), target company, and target product) intended by the user in the AI service.

At operation 509, the processor may control to output at least one feedback based on the identity information corresponding to the identified BI. According to an embodiment, the processor 120 may generate the identity information based on at least part of a color (e.g., red, green, white, and black), a sound, a logo, and an image corresponding to the BI. According to an embodiment, the processor may control to output the feedback in a feedback mode corresponding to at least one identity information. According to an embodiment, the processor 120 may output voice-based feedback alerting the user to the final phase.

According to an embodiment, the processor 120 may output feedback with a voice different from the voice used for interaction of the AI service (different in tone, different in gender, different in accent, and distinct voice based on emphasis utterance per-letter).

According to an embodiment, the processor 120 may control to display to emphasis a final phase confirmation button based on first information (e.g., color (e.g., red)) according to the identity information and output the feedback with a voice distinguished from the previously used voice.

According to an embodiment, the processor 120 may output the feedback with second information (e.g., CM song) in association (combination) with the distinguished voice. For example, it may be possible to output the CM song followed by or simultaneously with the distinguished voice. According to various embodiments, the processor 120 may output the feedback with information of multiple identities.

Figure 6A:
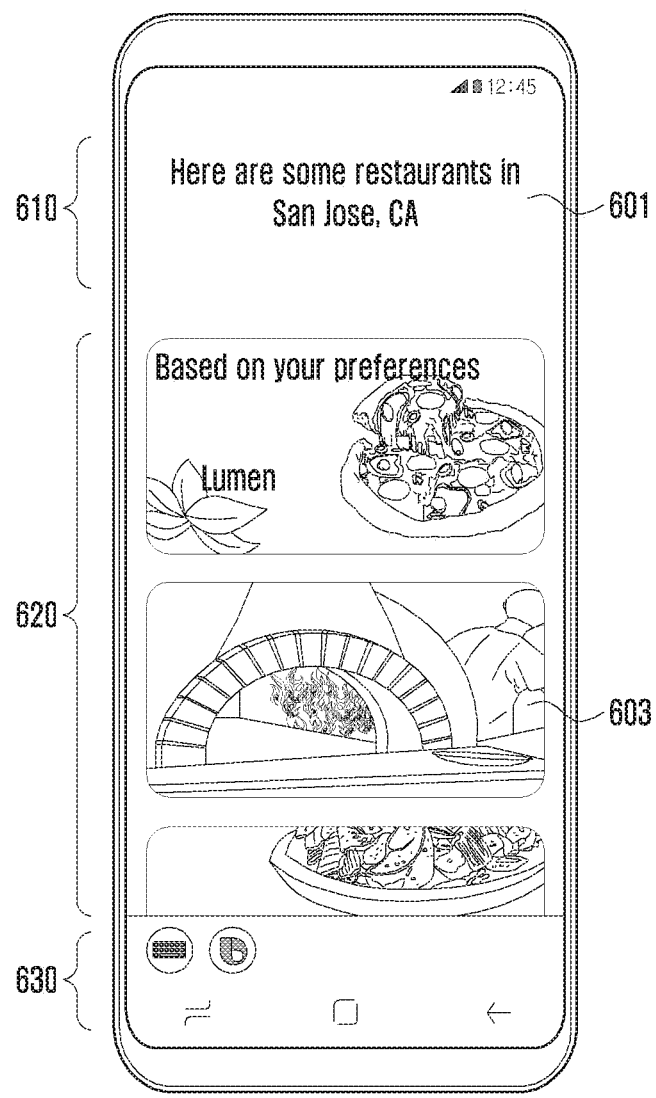
FIGS. 6A, 6B, and 6C are diagrams illustrating an operation scenario of an electronic device according to an embodiment of the disclosure.
Figure 6B:
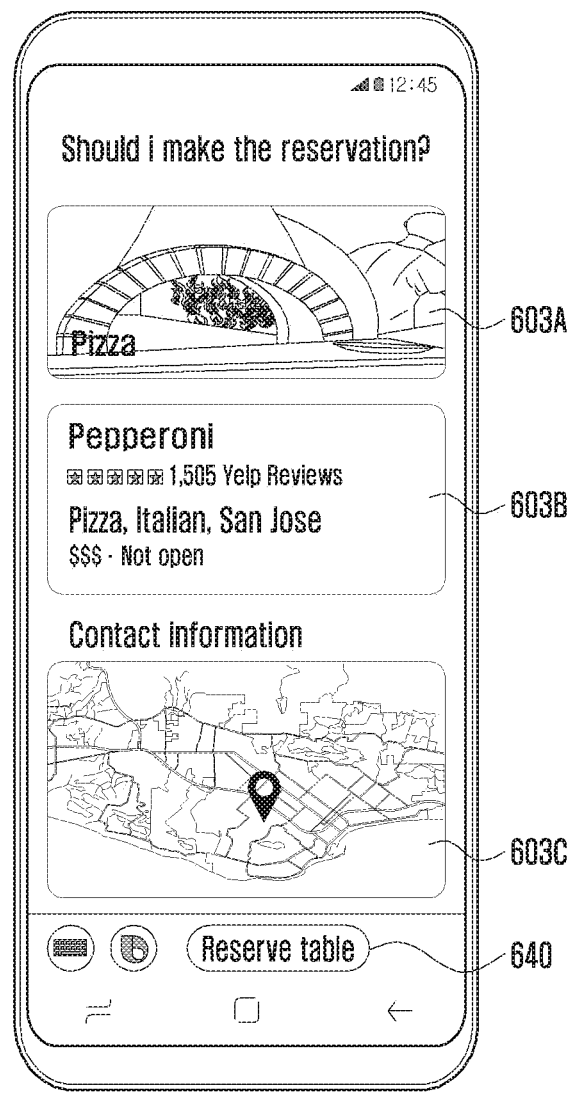
Figure 6C:
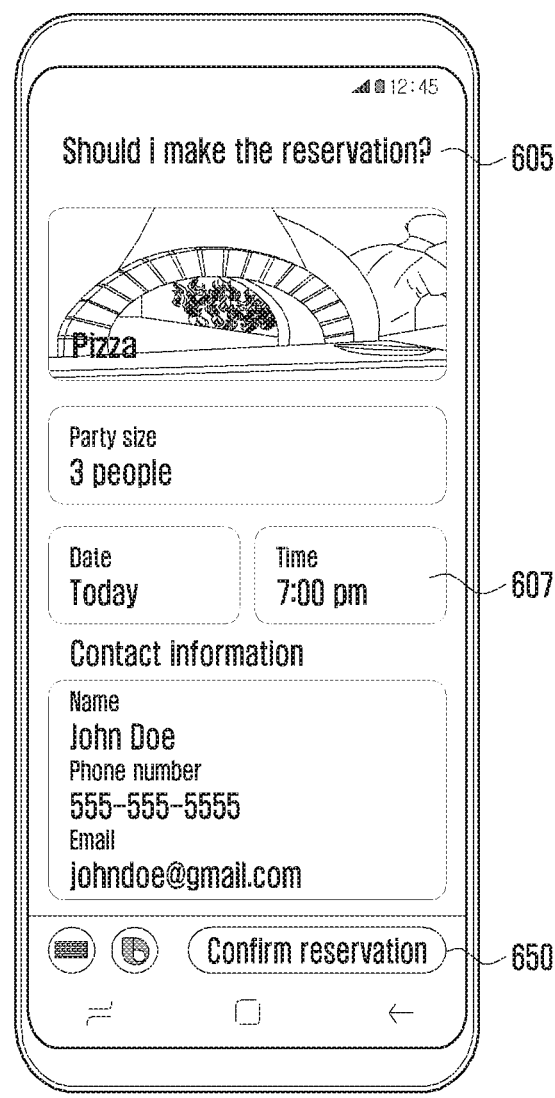

FIGS. 6A, 6B, and 6C are diagrams illustrating an operation scenario of an electronic device according to an embodiment of the disclosure.

Referring to FIGS. 6A, 6B, and 6C, a user may execute a virtual secretary (or voice agent) (e.g., AI service Bixby) on an electronic device 101. According to an embodiment, the virtual secretary may be executed by a voice command for execution (or wakeup) of the virtual secretary. According to an embodiment, the virtual secretary may be executed based on an input made with a button configured for executing the virtual secretary.

According to an embodiment, the electronic device 101 may execute the virtual secretary in response to a virtual secretary execution request from the user and display a pertinent interface via a display (e.g., the display device 160 in FIG. 1). Additionally or selectively, the electronic device 101 may notify the user of the execution of the virtual secretary with a sound (or voice) corresponding to the execution of the virtual secretary. According to an alternative embodiment, the electronic device 101 is a device (e.g., a smart speaker) without a display (e.g., the display device 160 in FIG. 1) and, in this case, it may notify the user of the execution of the virtual secretary with a sound (or voice) corresponding to the execution of the secretary. In the following description, it is assumed that the electronic device 101 is a smartphone with a display.

According to various embodiments, after execution of the virtual secretary, the electronic device 101 may perform a dialogic interaction with the user. According to an embodiment, the electronic device 101 may collect the user's voice utterance, analyze the collected voice utterance to identify the user's intention, generate responsive information, and display the responsive information via the display and/or output the responsive information via a speaker to the user.

In the embodiment of FIGS. 6A, 6B, and 6C, the user may use a restaurant reservation service as one of AI services of the virtual secretary. For example, the user may make a request to the electronic device 101 for information on restaurants (e.g., make an utterance "Find a Brazilian steak house" to request for searching; the electronic device 101 may identify the user's intention to request for a recommendation (or search) for restaurants, search for and collect pertinent information, and provide (or respond to) the user with the pertinent information. For example, the electronic device 101 may display an interface for providing the user with the information collected through the interaction with the user as shown in an exemplified screen display of FIG. 6A. According to an embodiment, the interface may include at least one of a first region 610 (e.g., an interaction region or an interactive region), a second region 620 (e.g., information region), or a third region (e.g., a panel region).

According to an embodiment, the electronic device 101 may display first information 601 (e.g., recommended category information, such as "Here are some restaurants in San Jose, Calif.") as a response (e.g., a response message) to the intention identified from the user's utterance. According to an embodiment, the first information 601 may be output (or announced or guided) through a speaker in the form of a voice.

According to an embodiment, the electronic device may display second information 602 (e.g., a representative image, a restaurant name, and a type of food per restaurant as collected restaurant information) in the second region 620. According to an embodiment, the second region 620 may be configured to be scrollable for navigating for the information.

According to an embodiment, the third region 630 may be a region fixed or prepared for providing objects for receiving the user's data input (e.g., a voice input execution or a text input) and/or confirmation on a process (or ongoing process) through an interaction with the user.

According to an embodiment, the user may select and designate a specific item from the information provided through the interaction. For example, the user may utter a voice command for selecting an item 603 related to "Pizza". The electronic device 101 may analyze the interaction with the user to identify the user's intention and provide a page for details on the item 603 as shown in FIG. 6B. According to an embodiment, the electronic device 101 may perform a voice-based interaction with the user about the page for details.

As shown in an exemplified screen display of FIG. 6B, the electronic device 101 may provide the user with the page for details on the item 603 selected by the user's utterance. For example, the electronic device may provide the user with detailed information (e.g., representative image 603A about the user-intended food (e.g., Pepperoni Pizza), supplementary information 603B about the food, and address information 603C (e.g., MAP information)) collected in association with the item 603 (e.g., collected from an external server).

According to an embodiment, the electronic device 101 may provide an object 640 (e.g., a button, an icon, and a text) for receiving a confirmation on progress to the next phase in the third region 630. The user may make a touch-based command by touching onto the object 640 or voice-based command for progress to the next phase. According to various embodiments, the object 640 for receiving a confirmation on progress to the next phase may be provided in a common manner without any separate feedback during the process. For example, objects appearing at intermediate phases may commonly be provided in a generalized form (e.g., basic color buttons) so as to be more emphasized (or highlighted) than an object appearing at a final phase.

According to an embodiment, the user may make a command for progress to the next phase with the object 640 appearing at an intermediate phase in the state of being shown in an exemplified screen display of FIG. 6B. For example, the user may input a command for reservation for a restaurant. The electronic device may analyze the interaction with the user for identifying the user's intention to provide a page for execution of a function (or service) (e.g., restaurant reservation) intended by the user as shown in an exemplified screen display of FIG. 6C.

As shown in an exemplified screen display of FIG. 6C, the user may fill in parameters 607 (or fields) (e.g., number of persons for the reservation, reservation date, reservation time, and contact information) related to a function (or service) (e.g., reservation) through interaction with the electronic device 101. According to an embodiment, the electronic device 101 may monitor the progress of the function (or service) for entry to the final phase. According to an embodiment, the electronic device may determine entry to the final phase if all of the parameters 607 related to the function (or service) are filled in.

According to various embodiments, the electronic device 101 may, upon detection of the entry to the final phase, provide the user with feedback at least one time to alert the user to the entry to the final phase (e.g., actual reservation) of the function (or service).

According to an embodiment, the electronic device may output a voice feedback along with displaying fourth information 605 (e.g., information reminding the user, such as "Should I make the reservation?") related to a response (response message) for receiving a confirmation on the final phase in the first region 610. According to an embodiment, the electronic device 101 may output the fourth information 605 (e.g., "Should I make the reservation?") through a speaker with a voice different in property (or characteristic) from the voice used through the interaction with the user for the previous process. For example, the electronic device 101 may output a voice different (or distinguished) (e.g., in tone, gender, accent, and per-letter stress) from the voice used for the interaction with the user during the previous process.

According to an embodiment, the electronic device 101 may provide an object 650 (e.g., a button, an icon, and a text) for receiving a confirmation on the final phase in the third region 630 (e.g., a panel region) in an emphasized (or highlighted) manner.

According to various embodiments, the object 650 for receiving a confirmation on the final phase may be provided in a manner differentiated from an object for receiving a confirmation on progress to the next phase as exemplified in the screen display of FIG. 6B. According to an embodiment, the electronic device 101 may make the feedback to the user with a color different from that used in common for the first object 640 during the progress.

According to various embodiments, a BI (or service application-specific identity) may be reflected to the feedback made with the second object 650. For example, the second object 650 may be graphically emphasized (or highlighted) to alert the user to the final phase with a representative color or a representative image (or icon) symbolizing a company related to the function (or service) in progress.

According to various embodiments, the electronic device 101 may apply various effects (e.g., graphical effects) including a color change to the second object 650, the effects being not applied to the first object 640, and provide feedback to alert the user to the final phase based on the screen as well as the second object 650. Detailed descriptions thereof are made later with reference to the accompanying drawings.

Figure 7:
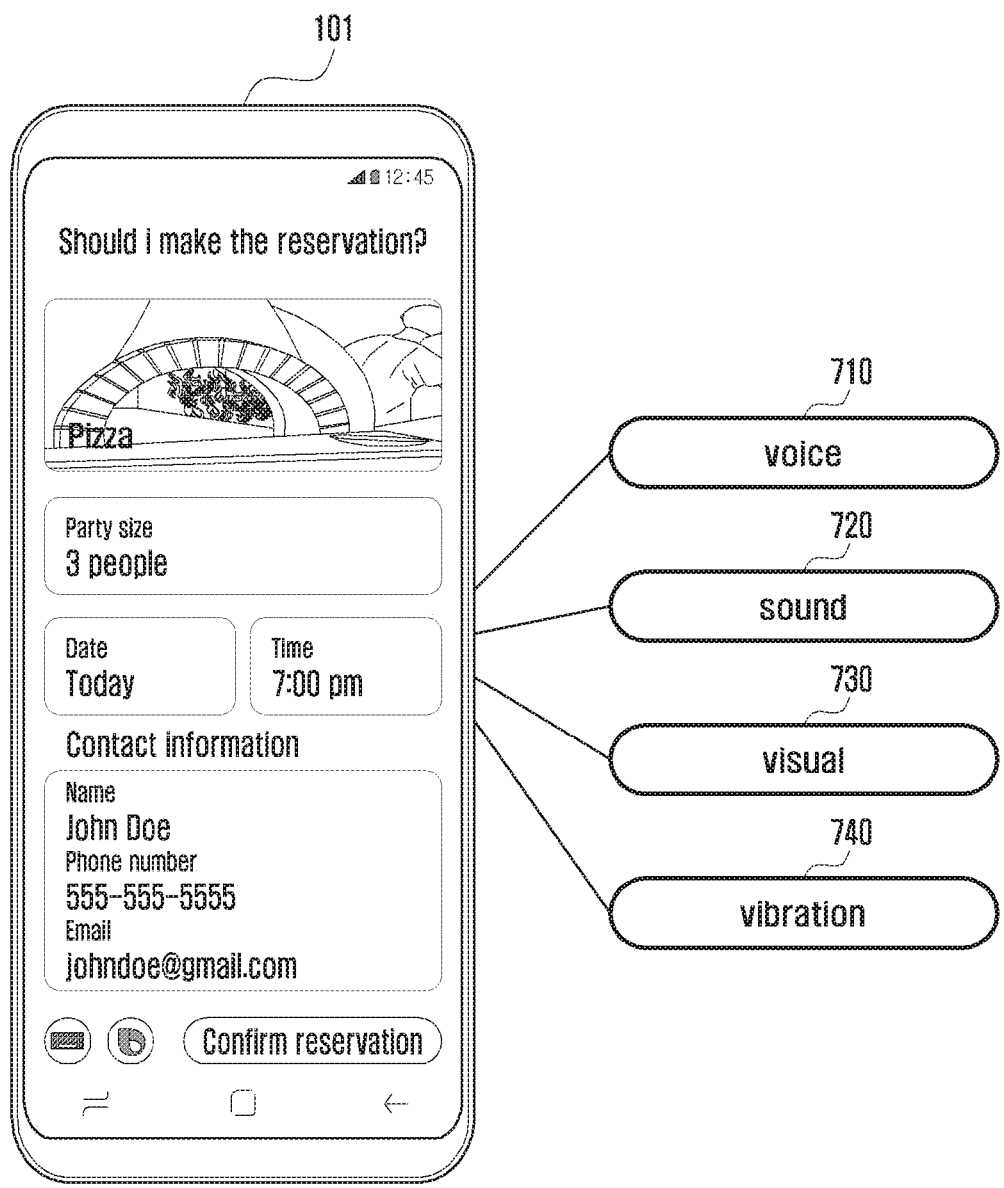
FIG. 7 is a diagram illustrating a feedback method of an electronic device according to an embodiment of the disclosure.

FIG. 7 is a diagram illustrating a feedback method of an electronic device according to an embodiment of the disclosure.

Referring to FIG. 7, the electronic device 101 may control to output feedback at least once in a feedback mode upon detection of entry to a final phase of a virtual secretary operation. According to various embodiments, the feedback may be output to alert the user to a situation to which the user has to pay a special attention in at least one of a voice mode 710, a sound mode 720, a visual mode 730, or a vibration mode 740.

In various embodiments, the voice mode 710 may be a feedback mode for providing feedback with a predetermined voice property (e.g., a tone, a gender-specific voice, an accent, a stressed vocalization, and a character-specific voice) to alert the user to the final phase. According to an embodiment, the electronic device 101 may output the feedback alerting the user to the final phase with a second voice tone different from a first voice tone (e.g., a tone of a voice output) used during a previous process. According to an embodiment, the electronic device 101 may output the feedback alerting the user to the final phase with the second voice different in accent (e.g., pitch of voice) from the first voice used during the previous process. According to an embodiment, the electronic device 101 may output the feedback alerting the user to the final phase with a second voice different in gender from a first voice used during the previous process. According to an embodiment, the electronic device 101 may output the feedback alerting the user to the final phase with a second vocalization (e.g., characterized by stressing each letter (or word) as in "D.o. Y.o.u. w.a.n.t. t.o. b.o.o.k?) different from a first vocalization used during the previous process.

In various embodiments, the sound mode 720 may be a feedback mode for outputting feedback alerting the user to the final phase with a predetermined sound. According to an embodiment, the predetermined sound may be one of various sounds that are capable of effectively alerting the user to or reminding the user of entry to the final phase of the process in running (or in progress) with auditory elements. According to an embodiment, the predetermined sound may include a melody, a beep sound, an alarm sound, a prefix sound (e.g., a voice-based sound, such as a user's name), and a unique sound reminding of a BI.

According to an embodiment, the sound mode 720 may operate independently (or individually) or in combination (coordination) with the voice mode 710. For example, the feedback may be output in a hybrid manner such that a predetermined sound is output in the form of background music (MGM) while a voice alert is output in the voice mode 710. For example, the feedback may be provided in such a way of producing a prefix with a voice calling the user (or user's name) before outputting a voice for use in the voice mode 710 and outputting the voice in the voice mode 710 after producing the prefix.

In various embodiments, the visual mode 730 may be a feedback mode for outputting feedback alerting the user to the final phase with a predetermined visual effect. According to an embodiment, the predetermined visual effect may be one of various visual effects capable of effectively alerting the user to or reminding the user of entry to the final phase of the process in running (or progress) with a visual element. According to an embodiment, the predetermined visual effect may include change of a graphical element (e.g., change of color, change of shape, addition of icon) of at least one object (e.g., button for identifying the user) displayed on a screen, change of screen brightness (e.g., local change or global change), and a lighting effect (e.g., LED lighting and edge lighting) by using at least part of the electronic device 101. According to an embodiment, the visual mode 730 may operate independently (or individually) or in combination (cooperation) with the visual mode 730, the voice mode 710, and/or the sound mode 720.

In various embodiments, the vibration mode 740 may be a feedback mode for outputting feedback alerting the user to the final phase with a predetermined vibration effect. According to an embodiment, the predetermined vibration effect may be one of various vibration patterns that are capable of effectively alerting the user to or reminding the user of entry to the final phase of the process with a tactile (or haptic) element. According to an embodiment, a vibration pattern may be a unique vibration pattern for a BI (e.g., a pattern having a beat, strength, and pace based on a CM song (or logo song) of the BI).

According to various embodiments, the voice mode 710, the source mode 720, the visual mode 730, and the vibration mode 740 may operate independently or in combination of at least two of them based on at least a configured mode or a device characteristic of the electronic device 101. For example, the electronic device 101 may provide feedback alerting the user to the final phase through multimodal interaction. For example, the electronic device 101 may output feedback with at least one of voice, graphic, music (sound), image, light, or vibration in a multimodal manner.

FIGS. 8A, 8B, 8C, and 8D are diagrams illustrating a feedback method of an electronic device according to various embodiments of the disclosure.

Referring to FIGS. 8A to 8D, the electronic device 101 includes a display as exemplified in FIG. 6A; part of the electronic device 101 is depicted in an enlarged scale. For example, FIGS. 8A to 8D show an example of providing feedback with at least one effect in a visual mode using an object (e.g., the object 650 in FIG. 6) presented in a panel region (e.g., the third region 630 in FIG. 6D) at a final phase.

Figure 8A:
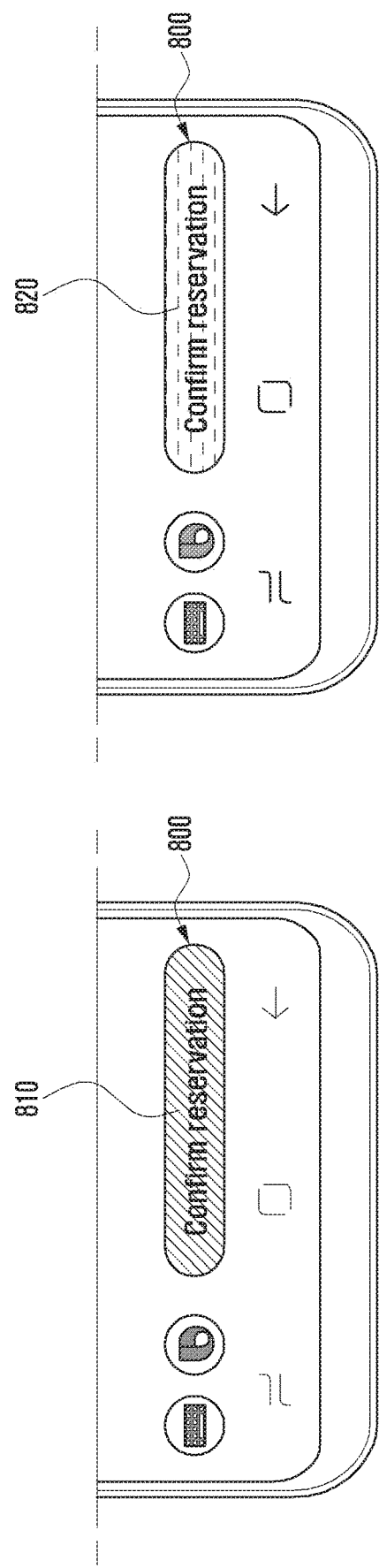

Referring to FIG. 8A, the electronic device may provide an object 800 (e.g., a button, an icon, and a text) (hereinafter, referred to as confirmation object) for receiving a confirmation on a final phase, the object varying in color depending on the phase, according to an embodiment. For example, the electronic device 101 may display the confirmation object 800 colored with a first color (e.g., red) as denoted by reference number 810 or a second color (e.g., green) as denoted by reference number 820. According to an embodiment, the confirmation object 800 may be displayed in a color that identically represent a brand based on the corresponding BI. For example, the electronic device 101 may display the confirmation object 800 in a predetermined color (e.g., blue) representing a company S upon detecting entry to a final phase of a service associated with company S (or product of company S).

Figure 8B:
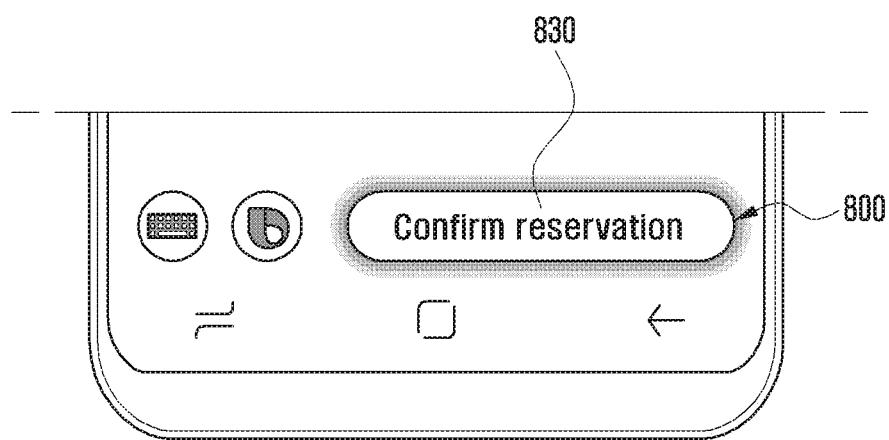

Referring to FIG. 8B, the electronic device 101 may provide feedback for receiving confirmation on the final phase with the confirmation object on which the visual effect is distinct from a previous one so as to attract a user's focus according to an embodiment. For example, the electronic device 101 may emphasize (or highlight) the confirmation object 830 with a glow fade-in/fade-out effect on the boundary of the confirmation object 800.

Referring to FIG. 8C, the electronic device 101 may provide feedback for receiving confirmation on the final phase with the confirmation object 800 (e.g., a button) in which a text property is distinct from a previous one according to an embodiment. For example, the electronic device 101 may change the text color inside the button from a first color as denoted by reference number 840 to a second color as denoted by a second color 850. For example, the electronic device 101 may display the confirmation object 800 with a blinking effect such that the text inside the confirmation object 800 is blinking. For example, the electronic device 101 may display the confirmation object 800 with a reversion effect such that the text inside the confirmation object 800 is repetitively reversing between contrasting colors. For example, the electronic device 101 may display the confirmation object 800 such that the text inside the confirmation object 800 is repetitively reversing between a first color (e.g., white) as denoted by reference number 840 and a second color (e.g., black) as denoted by reference number 850.

Figure 8D:
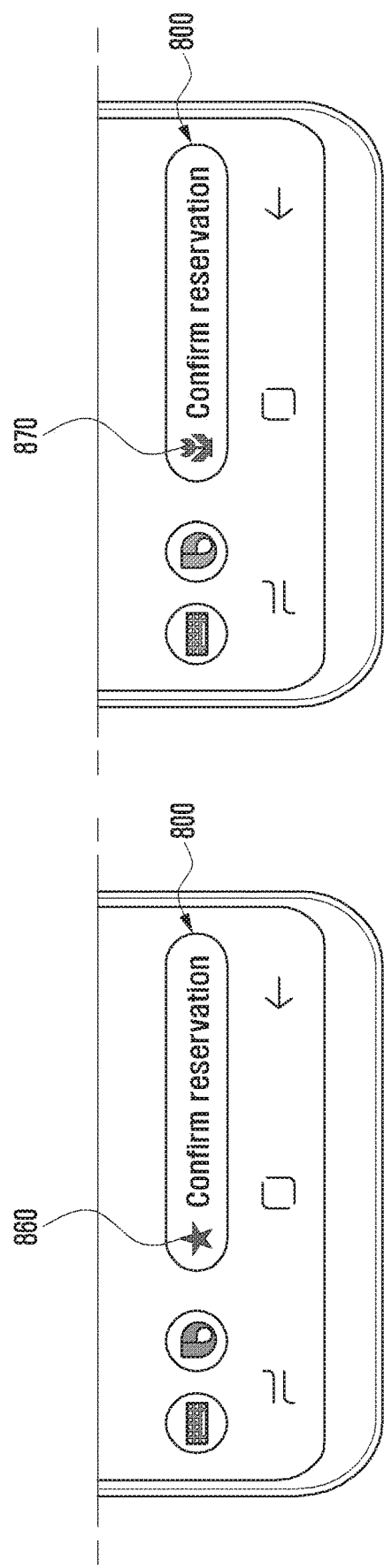

Referring to FIG. 8D, the electronic device 101 may provide feedback for receiving confirmation on the final phase with the confirmation object 800 of which shape is distinct from a previous one or in which an additional object (e.g., an icon, a logo, and an image) is distinct from a previous one according to an embodiment. For example, the electronic device 101 may display the confirmation object 800, inside thereof, with a representative object (e.g., a logo, an icon, and an image) that is capable of identifying the corresponding brand (or service or function) as denoted by reference numbers 860 and 870. For example, the electronic device 101 may change the shape of the confirmation object 800 so as to identify the corresponding brand (or service or function) with the changed shape. According to an embodiment, the shape of the confirmation object 800 or the object added inside the confirmation object as denoted by reference numbers 860 and 870 may be changed to another shape or object preconfigured to identify the final phase.

Figure 9A:
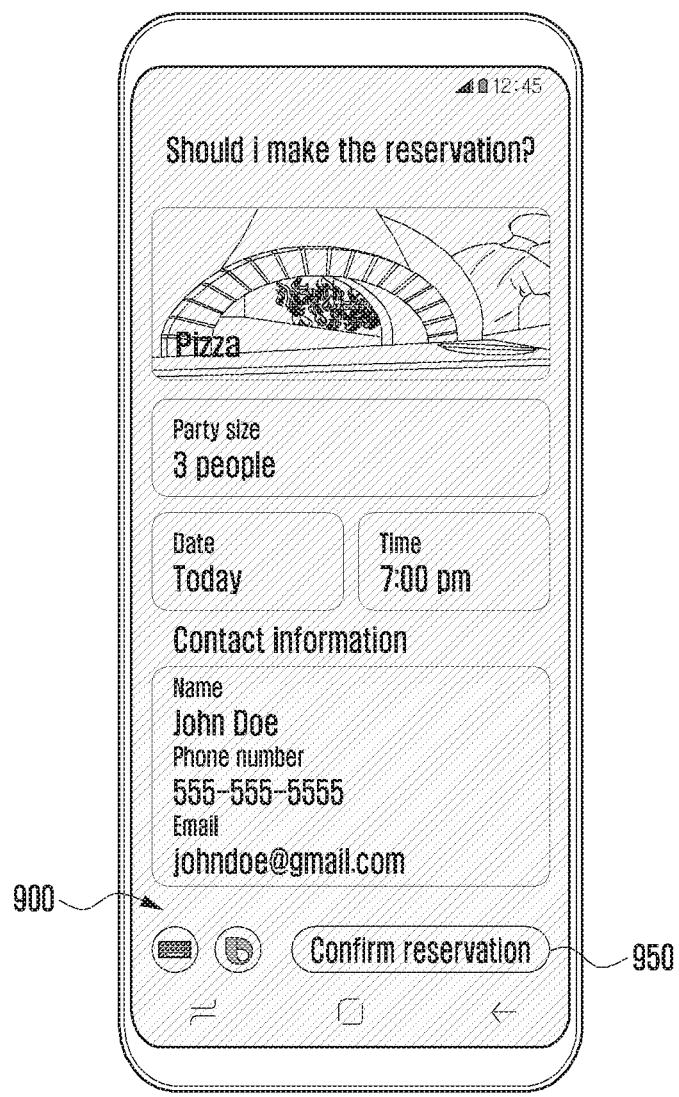
FIGS. 9A and 9B are diagrams illustrating a feedback method of an electronic device according to various embodiments of the disclosure.
Figure 9B:
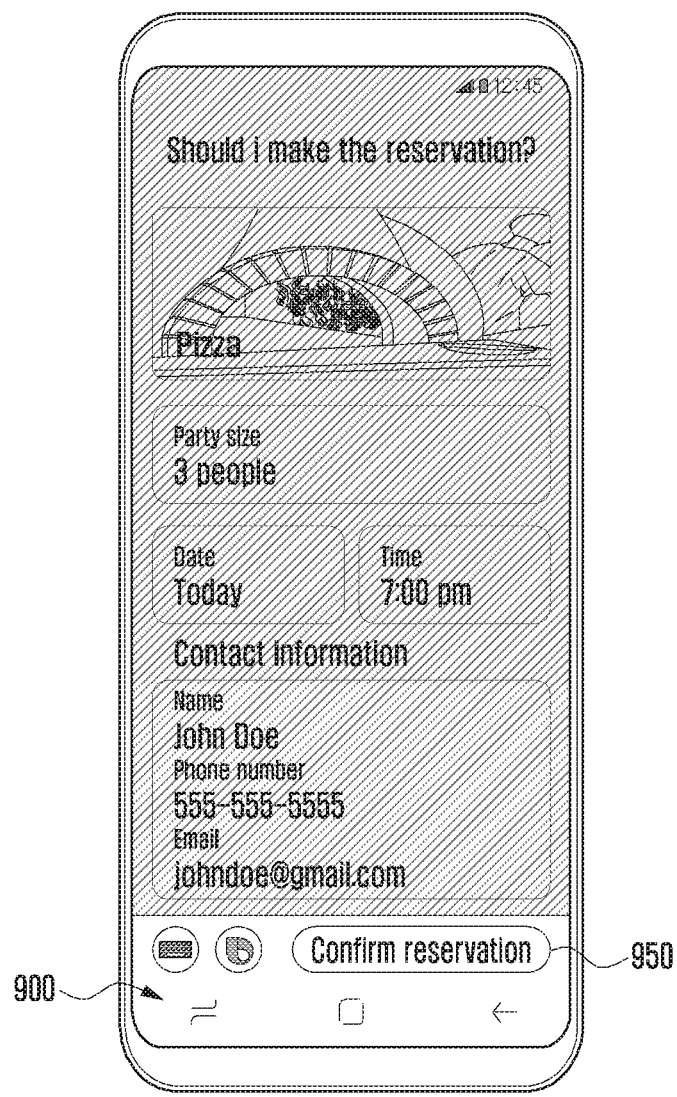

FIGS. 9A and 9B are diagrams illustrating a feedback method of an electronic device according to various embodiments of the disclosure.

FIGS. 9A and 9B illustrate a situation where the electronic device provides feedback alerting the user to a final phase by adjusting the screen brightness of the electronic device 101.

Referring to FIG. 9A, the electronic device 101 may alert (or emphasize) the user to the final phase by changing the brightness of at least a region of the screen (e.g., whole or part of the screen) for a predetermined brightness (e.g., maximum brightness) upon detection of entry to the final phase (e.g., all parameters for a service are filled in) according to an embodiment. According to an embodiment, the electronic device 101 may change the screen brightness for the maximum brightness upon detection of entry to the final phase and maintain the maximum brightness during a predetermined time period. According to an embodiment, the electronic device 101 may change the brightness back to the previous brightness after expiry of the predetermined time period. According to an embodiment, the electronic device 101 may change the screen brightness globally or locally. According to an embodiment, the local brightness change may be performed in such a way of changing the brightness of the screen with the exception of a panel region 900 (or object 950).

Referring to FIG. 9B, the electronic device 101 may alert the user to the final phase with a fade-in/fade-out effect at a region of the screen (e.g., whole or part of the screen) upon detection of entry to the final phase (e.g., all parameters for a service are filled in) according to an embodiment. According to an embodiment, the electronic device 101 may provide feedback by applying the fade-in/fade-out effect locally or globally in the screen to alert the user to the final phase. According to an embodiment, the local fade-in/fade-out effect may be applied to the screen with the exception of the panel region 900 (or object 950) during a predetermined period.

Figure 10:
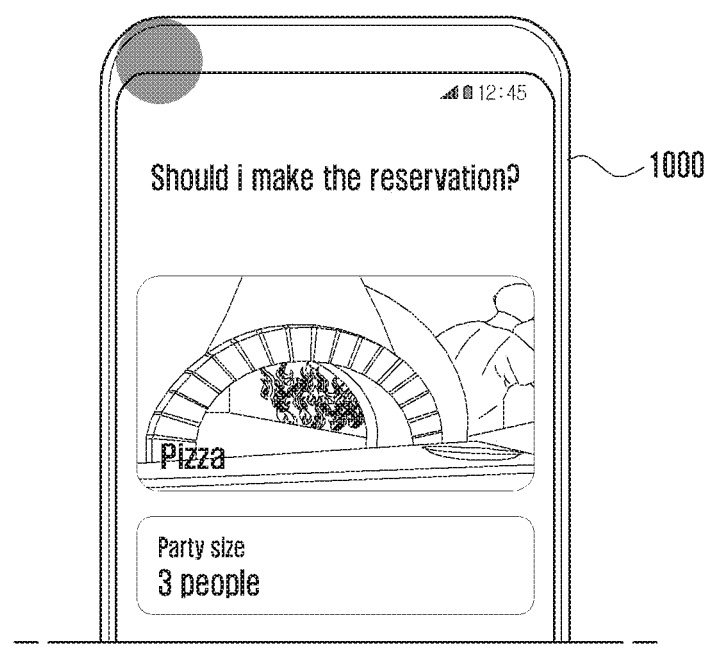
FIG. 10 is a diagram illustrating a feedback method of an electronic device according to an embodiment of the disclosure.

FIG. 10 is a diagram illustrating a feedback method of an electronic device according to an embodiment of the disclosure.

Referring to FIG. 10, the electronic device 101 may provide feedback alerting the user to a final phase with a light-emitting component (e.g., an LED and an edge region).

Referring to FIG. 10, the electronic device 101 may emit a light around an outskirt (or edge) of the electronic device 101 upon detection of entry to a final phase according to an embodiment. According to an embodiment, the electronic device 101 may provide feedback alerting the user to the final phase using an edge lighting notification. According to an embodiment, the electronic device 101 may provide feedback alerting the user to the final phase using a lighting effect 1000 created by a light emitting component (e.g., an LED).

Figure 11:
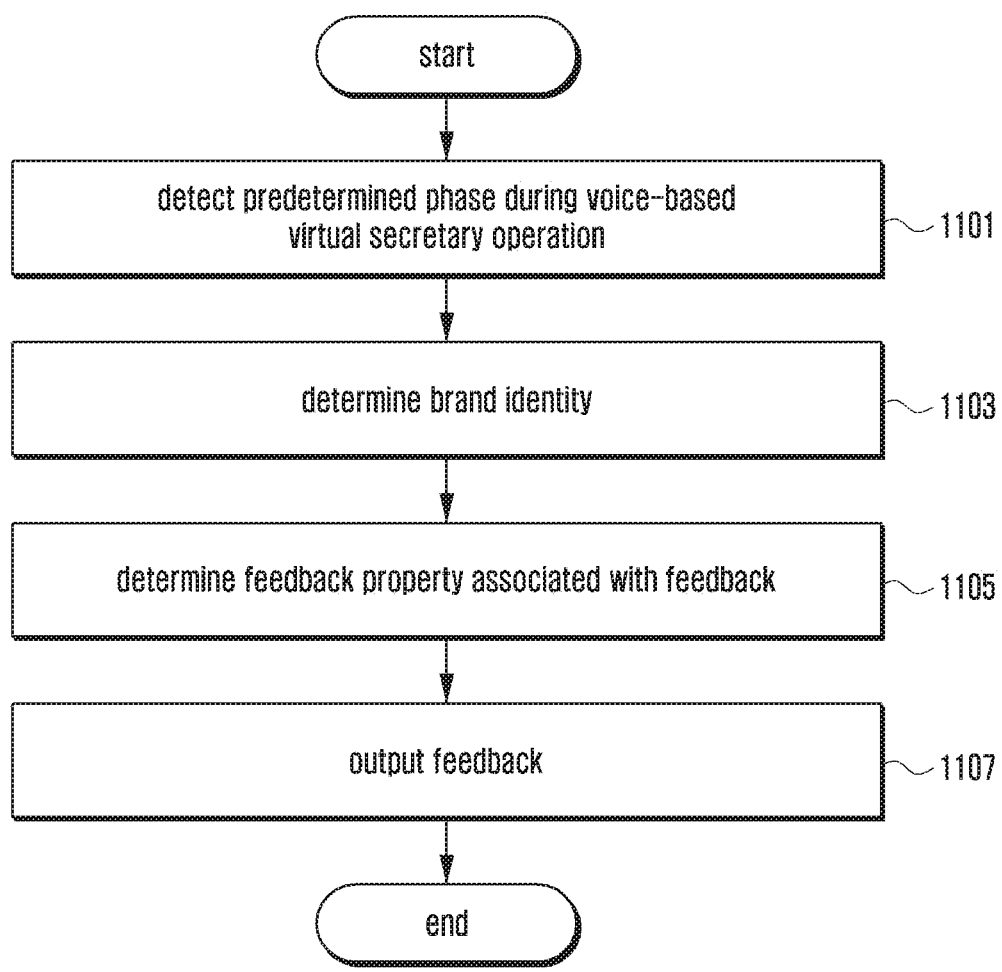
FIG. 11 is a flowchart illustrating an operation method of an electronic device according to an embodiment of the disclosure.

FIG. 11 is a flowchart illustrating an operation method of an electronic device according to an embodiment of the disclosure.

Referring to FIG. 11, a processor 120 (e.g., at least one processor including a processing circuit) (or function processing module 300 in FIG. 3) of the electronic device 101 may detect, at operation 1101, a predetermined phase of a voice-based virtual secretary operation. According to an embodiment, the processor 120 may monitor the virtual secretary operation to determine entry to a final phase based on a result of the monitoring.

At operation 1103, the processor 120 may determine a BI based on detection of the predetermined phase. In various embodiments, the BI may be an object allowing the user to quickly identify (recognize) a target (or brand) (e.g., a target function (e.g., information deletion function and message transmission function), target company, and target product) intended by the user in the AI service.

At operation 1105, the processor 120 may determine a feedback property in association with feedback. In various embodiments, the processor 120 may determine to use at least one of a first property (e.g., a display property (or graphical propriety)), a second property (e.g., a sound output property), a third property (e.g., visual (or lighting) property), or a fourth property (e.g., a vibration output property), at least based on the device property or device use state. According to an embodiment, the device characteristic may be determined at least based on whether the electronic device 101 includes a specific component (e.g., a display) or device type (e.g., a smartphone, a TV, a smart speaker, and a refrigerator).

At operation 1107, the processor 120 may control to output the feedback including the BI based on the feedback properties.

According to an embodiment, the processor 120 may provide feedback alerting the user to the final phase by emphasizing the BI with a graphical element upon determining to use the first property. According to an embodiment, the processor 120 may provide feedback alerting the user to the final phase by emphasizing the BI with a sound effect (e.g., a CM song) upon determining to use the second property. According to an embodiment, the processor 120 may provide feedback alerting the user to the final phase by emphasizing the BI with a lighting effect (e.g., a specific color lighting emitted by an LED) upon determining to use the third property. According to an embodiment, the processor 120 may provide feedback alerting the user to the final phase by emphasizing the BI with a vibration element (e.g., a vibration based on a specific pattern) upon determining to use the fourth property.

According to various embodiments, the processor 120 may determine to use at least two of the first to fourth properties to provide feedback alerting the user to the final phase by combining multiple feedback modes corresponding to the at least two properties. According to various embodiments, the processor 120 may provide voice-based feedback configured to alert the user to the final phase with BI-based feedback.

Figure 12:
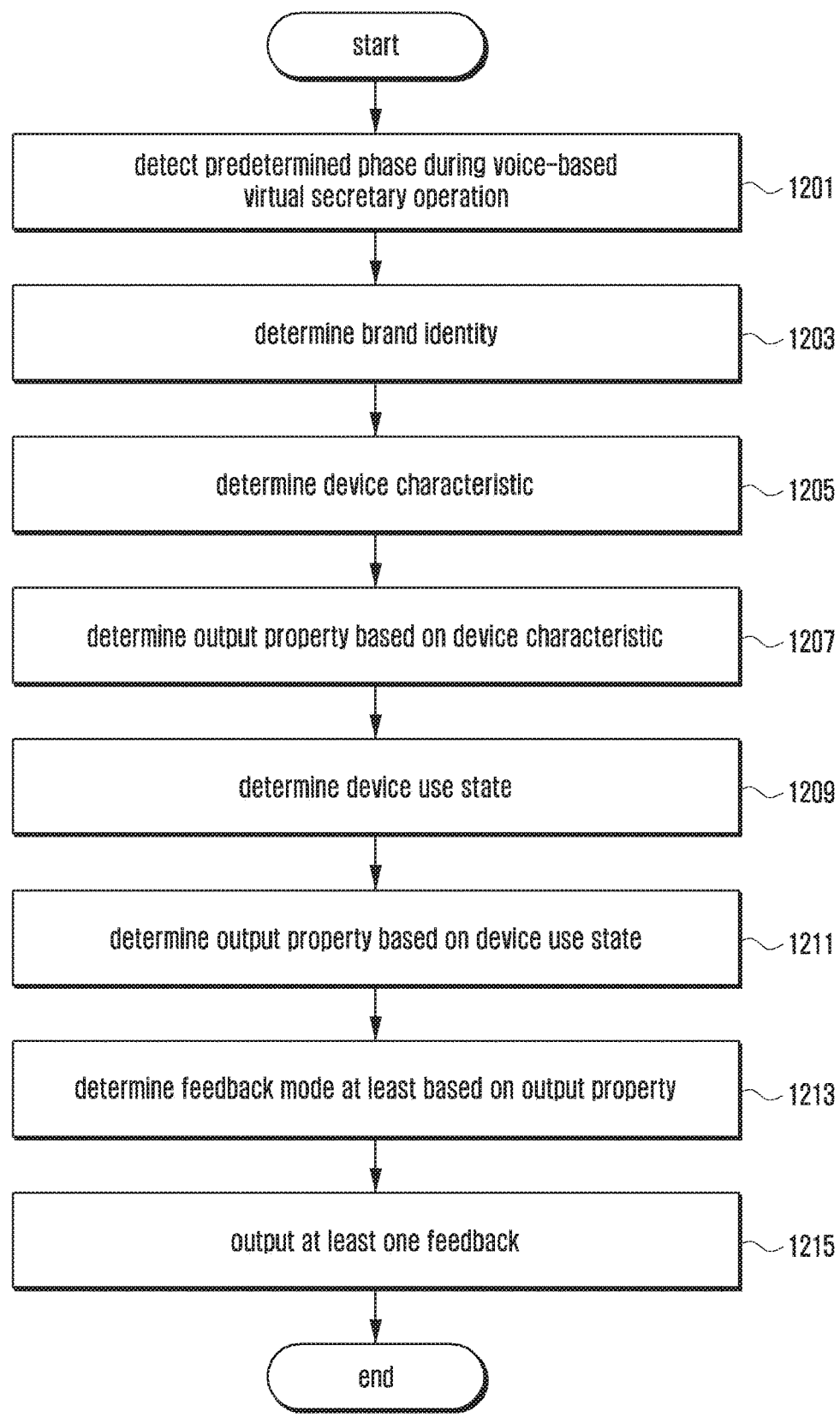
FIG. 12 is a flowchart illustrating an operation method of an electronic device according to an embodiment of the disclosure.

FIG. 12 is a flowchart illustrating an operation method of an electronic device according to an embodiment of the disclosure.

Referring to FIG. 12, a processor 120 (e.g., at least one processor including a processing circuit) (or function processing module 300 in FIG. 3) may detect, at operation 1201, a predetermined phase of a voice-based virtual secretary operation. According to an embodiment, the processor may detect entry to a final phase of the virtual secretary operation based on a result of monitoring a process. According to an embodiment, the processor 120 may determine entry to the final phase if all parameters (or fields) (e.g., number of persons for a reservation, reservation date, reservation time, and contact information) related to the corresponding function (or service) are filled in through interaction with the user.

At operation 1203, the processor may determine a BI in response to the detection of the entry to the predetermined phase. In various embodiments, the BI may include an object allowing the user to quickly identify (or recognize) a target (or brand) (e.g., a target function, a target company, or a target product) intended by the user in the AI service.

At operation 1205, the processor may determine a device characteristic. According to an embodiment, the processor 120 may determine the device characteristic (e.g., a feedback output mode) at least based on whether the electronic device 101 includes a specific component (e.g., a display, an LED, an optical output component, and a vibration output component). According to an embodiment, the processor 120 may determine the device characteristic at least based on a type of device (e.g., a smartphone, a TV, a smart speaker, and a refrigerator).

At operation 1207, the processor may determine an output property (e.g., a first property) at least based on the device characteristic. According to an embodiment, if the electronic device 101 includes a display, the processor 120 may determine that the electronic device 101 has a property capable of outputting feedback on a screen based on the electronic device 101 including a display. According to an embodiment, if the electronic device supports light emission with an edge lighting or LED functionality, the processor 120 may determine that the electronic device 101 has a property capable of outputting feedback with light. According to an embodiment, if the electronic device 101 supports vibration output, the processor 120 may determine that the electronic device 101 has a property capable of outputting feedback with vibration.

At operation 1209, the processor 120 may determine whether the device is in use. According to an embodiment, the processor may determine whether the electronic device 101 is in use (e.g., a hand-held state and a display turn-on state) using various situation sensing technologies. According to an embodiment, the processor 120 may determine whether a specific image is displayed on a display. According to an embodiment, the processor 120 may determine, using various face recognition technologies, whether the user is close to the electronic device 101 or gazing at the electronic device.

At operation 1211, the processor 120 may determine an output property (e.g., a second property) based on a use state of the device. According to an embodiment, if the electronic device is in use, the processor 120 may determine a property for output feedback in association with the use state of the device.

According to an embodiment, if the electronic device 101 is displaying a specific image on the display, the processor 120 may determine the feedback output property in association with the use of the display. According to an embodiment, the processor 120 may determine a feedback output property depending on whether the user is close to the electronic device 101. According to an embodiment, the processor 120 may determine a feedback output property depending on whether the user is gazing at the electronic device 101.

At operation 1213, the processor 120 may determine a feedback mode at least based on the output property. According to an embodiment, the processor 120 may finally determine the feedback mode based on a combination of the device characteristic-based output property and device use state-based output property. According to an embodiment, the processor 120 may determine to use at least one of a first property (e.g., a display property (or graphical propriety)), a second property (e.g., a sound output property), a third property (e.g., a visual (or lighting) property), or a fourth property (e.g., a vibration output property), at least based on the device property or device use state.

According to an embodiment, if the processor 120 includes all components for feedback with the first to fourth properties and the electronic device 101 is in use, the processor 120 may determine a feedback mode based on the first to fourth properties.

According to an embodiment, if the display is turned off or if the user is neither close to nor gazing at the electronic device 101 even though the electronic device 101 includes all components for feedback with the first to fourth properties, the processor 120 may determine a feedback mode based on the second and fourth properties with the exception of the first and third properties.

According to an embodiment, if the electronic device 101 does not include at least one of a display, an LED, and a vibration output component (e.g., a vibration motor), the processor 120 may determine a feedback mode based on at least one property corresponding to the use state of the device with the exception of the properties associated with the non-included components.

At operation 1215, the processor may control output of at least one feedback at least based on the BI and the feedback mode. According to an embodiment, if all of the first to fourth properties are determined, the processor 120 may provide feedback using all of screen output (e.g., a graphical element change or screen brightness adjustment), sound output (e.g., a voice output), lighting output (e.g., an LED output and edge lighting output), and vibration output (e.g., a patterned vibration output).

According to an embodiment, if the first and second properties are determined, the processor 120 may provide feedback using the screen output and the sound output. According to an embodiment, if the second and fourth properties are determined, the processor 120 may provide feedback using the sound output and the vibration output. According to an embodiment, if the second and third properties are determined, the processor 120 may provide feedback using the sound output and the lighting output.

According to various embodiments, the processor 120 may provide feedback by dynamically reflecting a BI according to the feedback mode. For example, the feedback may be provided in a feedback mode to which an object of a BI is applied at least based on a visual element, an auditory element, or a tactile element.

Figure 13:
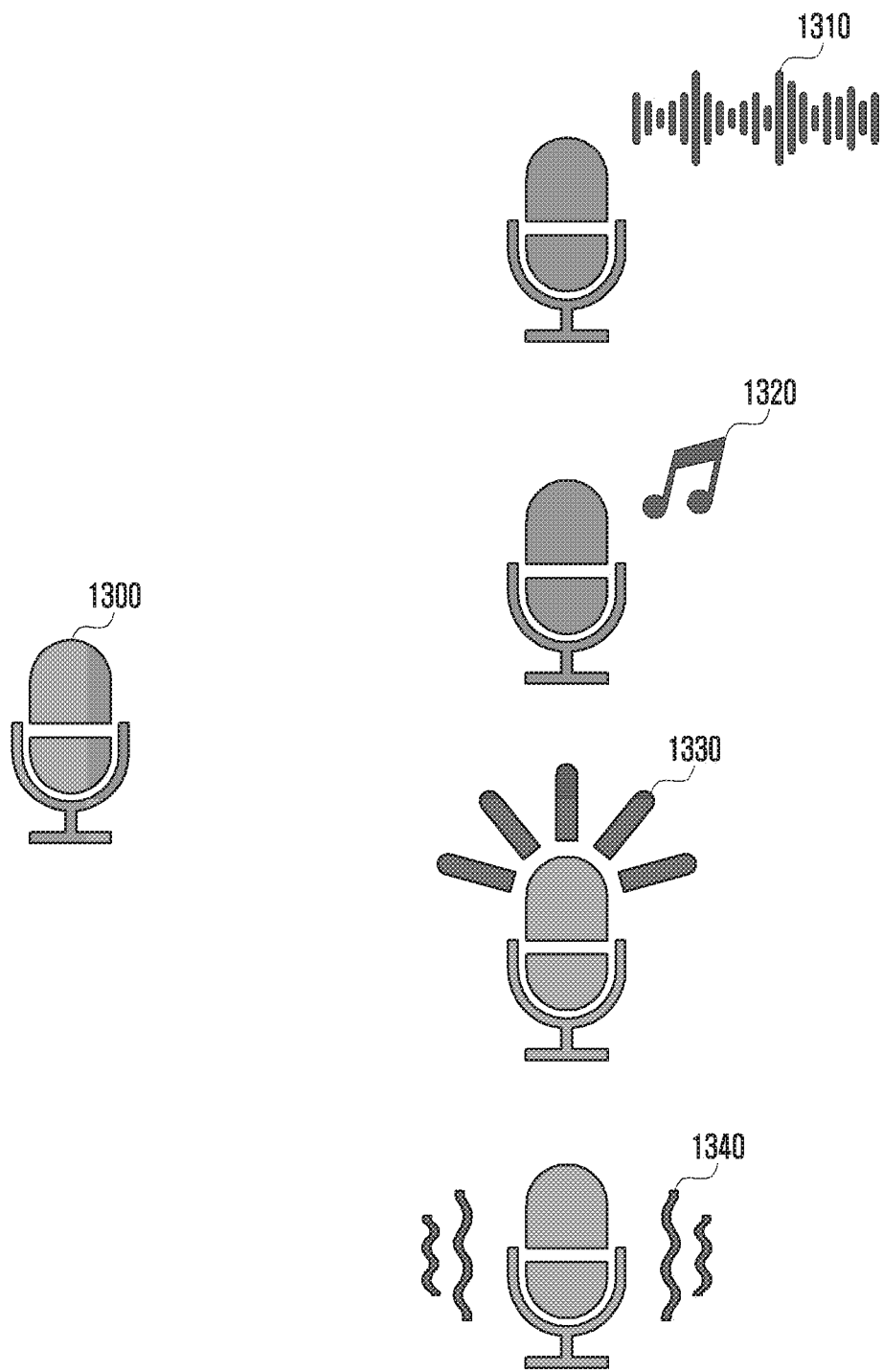
FIG. 13 is a diagram illustrating a feedback method of an electronic device according to an embodiment of the disclosure.

FIG. 13 is a diagram illustrating a feedback method of an electronic device according to an embodiment of the disclosure.

Referring to FIG. 13, it is assumed that the electronic device 101 is a device with no display (hereinafter, referred to as smart speaker 1300).

Referring to FIG. 13, if a final phase of a virtual secretary operation is detected, the smart speaker 1300 may control to output at least one feedback in a predetermined feedback mode. In various embodiments, the feedback may be output to alert the user to a situation to which the user has to pay special attention in at least one of a voice mode, 1310, a sound mode 1320, a visual mode 1330, or a vibration mode.

In various embodiments, the voice mode 1310 may be a feedback mode for the smart speaker 1300 to provide feedback based on a predetermined voice property (e.g., a tone, a gender-specific voice, an accent, a stressed vocalization, and a character-specific voice).

In various embodiments, the sound mode 1320 may be a feedback mode for the smart speaker 1300 to provide feedback based on a predetermined visual effect.

In various embodiments, the visual mode 1330 may be a feedback mode for the smart speaker to provide feedback based on a predetermined visual effect. According to an embodiment, the smart speaker 1300 may include no display and support light emission with an LED as shown in the drawing. In the visual mode 1330, the smart speaker 1300 may exclude a feedback mode for changing any graphical element (e.g., change in color, change in shape, or addition of an icon) or change in brightness on screen and provide feedback with a lighting effect using the LED.

In various embodiments, the vibration mode 1340 may be a feedback mode for the smart speaker 1300 to provide feedback based on a predetermined vibration effect.

According to various embodiments, the voice mode 1310, the sound mode 1320, the visual mode 1330, and the vibration mode 1340 may operate in different manners according to device characteristics. According to various embodiments, the voice mode 1310, the sound mode 1320, the visual mode 1330, and the vibration mode 1340 may operate independently or in combination of at least two of them. For example, the electronic device 101 may provide the user with feedback alerting the user to the final phase through multimodal interaction.

Figure 14:
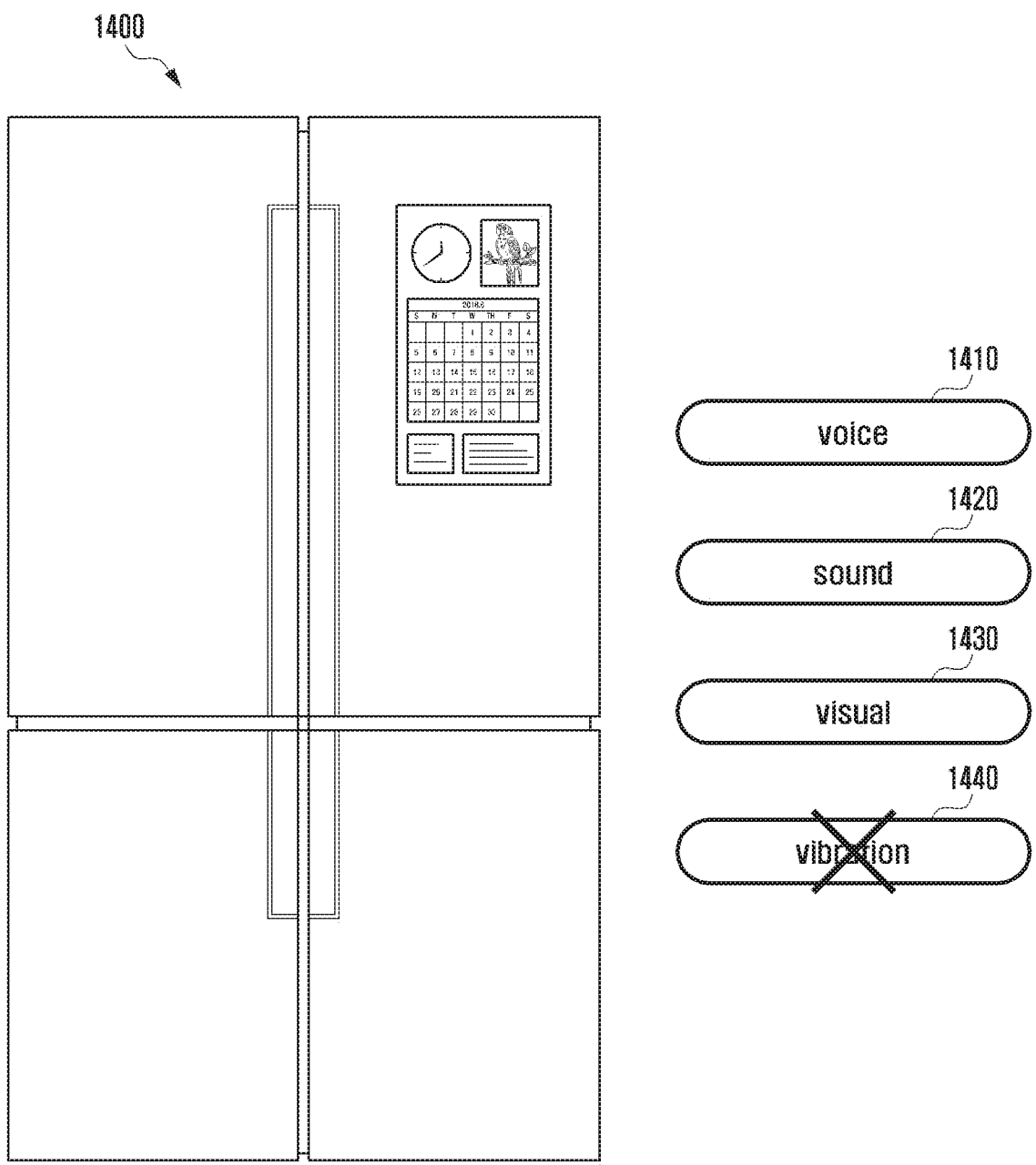
FIG. 14 is a diagram illustrating a device type-based feedback determination method of an electronic device according to an embodiment of the disclosure.

FIG. 14 is a diagram illustrating a device type-based feedback determination method of an electronic device according to an embodiment of the disclosure.

Referring to FIG. 14, the electronic device may be a large device (e.g., a refrigerator) (hereinafter, referred to as appliance device 1400).

Referring to FIG. 14, the appliance device 1400 may be a device that by the nature of the device does not support a vibration output. In various embodiments, the appliance device 1400 may support the voice mode 1410, the sound mode 1420, and the visual mode 1430 with the exception of the vibration mode 1440.

According to an embodiment, if a final phase of a virtual secretary operation is detected, the appliance device 1400 determine a proximity or gaze of the user based on a proximity sensing technology or a face recognition technology. According to an embodiment, if there is neither proximity of the user nor a user's gaze at the device, the appliance device 1400 may provide feedback at least based on the voice mode 1410 and the sound mode 1420 with the exception of the visual mode 1430.

As described above, an operation of the electronic device 101 according to various embodiments may include executing a service based on a dialogic interaction with a user, monitoring a process of the service, detecting entry to a predetermined phase based on a result of the monitoring, and outputting at least one feedback alerting the user to the predetermined phase.

According to various embodiments, monitoring the process may include determining whether the service enters a final phase in an operation scenario of the service during the dialogic interaction with the user.

According to various embodiments, determining whether the service enters the final phase may include determining entry to the final phase based on parameters associated with the operation scenario of the service all being filled in.

According to various embodiments, outputting the at least one feedback may include outputting the at least one feedback alerting the user to the entry to the final phase at least based on a visual element, an auditory element, or a tactile element.

According to various embodiments, outputting the at least one feedback may include outputting the at least one feedback based on at least one of a voice mode, a sound mode, a visual mode, or a vibration mode.

According to various embodiments, outputting the at least one feedback may include determining a feedback mode for the at least one feedback based on a device characteristic of the electronic device.

According to various embodiments, outputting the at least one feedback may include determining a feedback mode for the at least one feedback based on a use state of the electronic device.

According to various embodiments, outputting the at least one feedback may include outputting the at least one feedback including a brand identity (BI).

According to various embodiments, the BI may include an object allowing the user to quickly identify a target intended by the user in the service.

According to various embodiments, outputting the at least one feedback may include configuring the BI with an object of a visual, auditory, or tactile element corresponding to a feedback mode.

An electronic device and operation method thereof according to various embodiments is advantageous in terms of providing feedback alerting a user to a final phase of an interactive service. An electronic device according to various embodiments is capable of monitoring a voice-based virtual secretary operation for entry to a final phase to provide feedback alerting the user to the entry to the final phase such that the user makes a final confirmation on an actually intended situation. An electronic device according to various embodiments is advantageous in terms of allowing the user to quickly recognize a category of a final phase by reflecting a BI to provide feedback alerting a user to the final phase. An electronic device according to various embodiments is advantageous in terms of improving a device's usability, convenience, accessibility, safety, reliability, and competitiveness by providing feedback alerting a user to a final phase of an interactive service.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device configured to confirm user intent prior to executing a final phase of an artificial intelligence (AI) service, the electronic device comprising:
   an input/output interface for performing a voice-based dialogic interaction with a user;
   a sensor module; and
   at least one processor configured to:
      execute the AI service based on the voice-based dialogic interaction with the user,
      identify user's intentions from utterances of the user and output responses corresponding to the user's intentions,
      monitor a process of the ongoing AI service for making a determination on entry to the final phase of the AI service in progress through the voice-based dialogic interaction with the user, the final phase being a phase for confirming whether to execute a command right before executing the command as a result of processing an interaction with a user,
      detect entry to the final phase based on a result of the monitoring,
      determine a brand identity (BI) in response to the detection of the entry to the final phase, the BI comprises an object allowing the user to quickly identify a target intended by the user in the AI service,
      determine a device characteristic of the electronic device based on whether the electronic device includes a component,
      determine a use state of the electronic device based on a proximity or gaze of the user,
      determine a feedback mode from among a plurality of feedback modes based on a device characteristic of the electronic device and based on the use state of the electronic device, and
      output, using the determined BI and the determined feedback mode, at least one feedback alerting the user to the final phase, the at least one feedback including information for use by the user in determining whether a result of the final phase matches the user's intentions,
   wherein the at least one processor is further configured to determine entry to the final phase based on parameters associated with an operation scenario of the AI service all being filled in.

2. The electronic device of claim 1, wherein the at least one processor is further configured to determine whether the AI service enters the final phase in the operation scenario of the AI service during the dialogic interaction with the user.

3. The electronic device of claim 2, wherein the at least one processor is further configured to output the at least one feedback alerting the user to the final phase, the at least one feedback comprising at least one of a visual element, an auditory element, or a tactile element.

4. The electronic device of claim 2, wherein the plurality of feedback modes comprises at least two of a voice mode, a sound mode, a visual mode, or a vibration mode.

5. The electronic device of claim 2, wherein the at least one processor is further configured to control to output the at least one feedback including the BI.

6. The electronic device of claim 1, wherein the at least one processor is further configured to configure the BI with an object of a visual, auditory, or tactile element corresponding to the feedback mode.

7. The electronic device of claim 1, wherein the determined feedback mode comprises a voice mode using a voice different than a voice used during the dialogic interaction with the user.

8. The electronic device of claim 1, wherein the at least one feedback receives a user input to confirm the user intent prior to completion of the final phase of the AI service.

9. The electronic device of claim 1,
wherein the at least one processor is further configured to determine whether there is a proximity of the user to the electronic device, and
wherein the determining of the feedback mode further comprises determining the feedback mode based on whether there is the proximity of the user to the electronic device.

10. The electronic device of claim 1,
wherein the at least one processor is further configured to determine whether a gaze of the user is detected, and
wherein the determining of the feedback mode further comprises determining the feedback mode based on whether the gaze of the user is detected.

11. The electronic device of claim 1, wherein visual alerts provided by the electronic device are color coded based on a phase of the AI service.

12. An operation method of an electronic device configured to confirm user intent prior to executing a final phase of an artificial intelligence (AI) service, the method comprising:
executing the AI service based on a voice-based dialogic interaction with a user;
identifying, using at least one processor of the electronic device, user's intentions from utterances of the user and outputting responses corresponding to the user's intentions;
monitoring, using the at least one processor, a process of the ongoing AI service for making a determination on entry to the final phase of the AI service in progress through the voice-based dialogic interaction with the user, the final phase being a phase for confirming whether to execute a command right before executing the command as a result of processing an interaction with a user;
detecting, using the at least one processor, entry to the final phase based on a result of the monitoring;
determining, using the at least one processor, a brand identity (BI) in response to the detection of the entry to the final phase, the BI comprises an object allowing the user to quickly identify a target intended by the user in the AI service,
determining, using the at least one processor, a device characteristic of the electronic device based on whether the electronic device includes a component,
determining, using the at least one processor, a use state of the electronic device based on a proximity or gaze of the user,
determining, using the at least one processor, a feedback mode from among a plurality of feedback modes based on a device characteristic of the electronic device and based on the use state of the electronic device; and
outputting, using the determined BI and the determined feedback mode, at least one feedback alerting the user to the final phase, the at least one feedback including information for use by the user in determining whether a result of the final phase matches the user's intentions,
wherein the determining of whether the AI service enters the final phase comprises determining entry to the final phase based on parameters associated with an operation scenario of the AI service all being filled in.

13. The method of claim 12, wherein the monitoring of the process comprises determining whether the AI service enters the final phase in the operation scenario of the AI service during the dialogic interaction with the user.

14. The method of claim 13, wherein the outputting of the at least one feedback comprises outputting the at least one feedback alerting the user to the final phase, the at least one feedback comprising at least one of a visual element, an auditory element, or a tactile element.

15. The method of claim 13, wherein the plurality of feedback modes comprises at least two of a voice mode, a sound mode, a visual mode, or a vibration mode.

16. The method of claim 13, wherein the outputting of the at least one feedback comprises outputting the at least one feedback including the BI.

17. The method of claim 12, wherein the outputting of the at least one feedback comprises configuring the BI with an object of a visual, auditory, or tactile element corresponding to the feedback mode.

* * * * *